(12) United States Patent
Imade

(10) Patent No.: US 9,210,341 B2
(45) Date of Patent: *Dec. 8, 2015

(54) IMAGE PROCESSING DEVICE, IMAGING DEVICE, INFORMATION STORAGE MEDIUM, AND IMAGE PROCESSING METHOD

(71) Applicant: OLYMPUS CORPORATION, Tokyo (JP)

(72) Inventor: Shinichi Imade, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 418 days.

This patent is subject to a terminal disclaimer.

(21) Appl. No.: 13/651,939

(22) Filed: Oct. 15, 2012

(65) Prior Publication Data
US 2013/0038758 A1    Feb. 14, 2013

Related U.S. Application Data

(63) Continuation of application No. PCT/JP2011/058757, filed on Apr. 7, 2011.

(30) Foreign Application Priority Data

Apr. 15, 2010 (JP) .................................. 2010-094288

(51) Int. Cl.
*H04N 5/349* (2011.01)
*H04N 1/21* (2006.01)
(Continued)

(52) U.S. Cl.
CPC .............. *H04N 5/349* (2013.01); *G06T 3/4069* (2013.01); *H04N 1/212* (2013.01); *H04N 2101/00* (2013.01)

(58) Field of Classification Search
CPC ...................................................... H04N 5/349
USPC ........................ 348/216.1, 218.1, 219.1, 239
See application file for complete search history.

(56) References Cited

U.S. PATENT DOCUMENTS 6,650,361 B1    11/2003  Shiomi
8,698,906 B2 *   4/2014  Imade ........................ 348/219.1
(Continued)

FOREIGN PATENT DOCUMENTS

JP    11-187307       7/1999
JP    2007-060437     3/2007
(Continued)

OTHER PUBLICATIONS

International Search Report dated May 10, 2011 issued in PCT/JP2011/058757.

*Primary Examiner* — Timothy J Henn
(74) *Attorney, Agent, or Firm* — Scully, Scott, Murphy & Presser, PC

(57) ABSTRACT

An image processing device includes a storage section, an estimation calculation section, and an image output section. A pixel is sequentially shifted so that overlap occurs to acquire a light-receiving value of the pixel as a low-resolution frame image. The storage section stores the low-resolution frame image. The estimation calculation section estimates estimated pixel values at a pixel pitch smaller than the pixel pitch of the low-resolution frame image. The image output section outputs a high-resolution frame image that has a resolution higher than that of the low-resolution frame image based on the estimated pixel values. The estimation calculation section calculates the difference between the light-receiving value of the pixel set at a first position and the light-receiving value of the pixel set at a second position, and estimates the estimated pixel values based on the difference.

18 Claims, 26 Drawing Sheets

(51) Int. Cl.
*G06T 3/40* (2006.01)
*H04N 101/00* (2006.01)

(56) References Cited

U.S. PATENT DOCUMENTS

2008/0095420 A1  4/2008  Ohyu et al.
2010/0309329 A1* 12/2010  Hiramoto ................... 348/222.1

FOREIGN PATENT DOCUMENTS

| | | |
|---|---|---|
| JP | 2007-311899 | 11/2007 |
| JP | 2008-119457 | 5/2008 |
| JP | 2008-243037 | 10/2008 |
| JP | 2009-124621 | 6/2009 |
| JP | 2009-181508 | 8/2009 |
| WO | WO 2010/038378 A1 | 4/2010 |

* cited by examiner

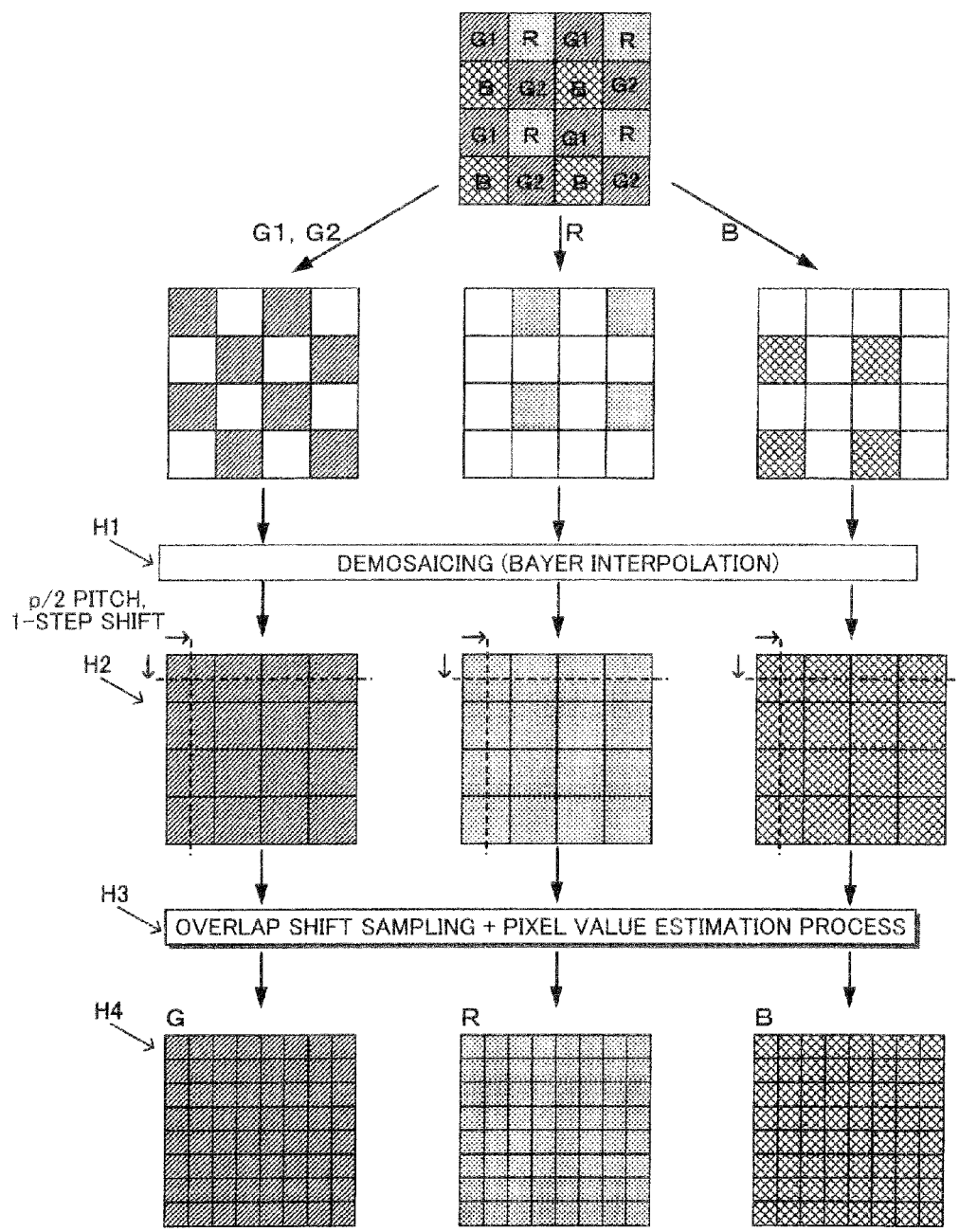

IMAGE PROCESSING DEVICE, IMAGING DEVICE, INFORMATION STORAGE MEDIUM, AND IMAGE PROCESSING METHOD

CROSS REFERENCE TO RELATED APPLICATION

This application is a continuation of International Patent Application No. PCT/JP2011/058757, having an international filing date of Apr. 7, 2011, which designated the United States, the entirety of which is incorporated herein by reference. Japanese Patent Application No. 2010-094288 filed on Apr. 15, 2010 is also incorporated herein by reference in its entirety.

BACKGROUND

The present invention relates to an image processing device, an imaging device, an information storage medium, an image processing method, and the like.

A digital camera and a video camera may be designed to allow the user to select a still image shooting mode or a movie shooting mode. For example, a digital camera and a video camera may be designed to allow the user to shoot a still image having a resolution higher than that of a movie by operating a button when shooting a movie.

In order to shoot the best moment, the inventor of the invention developed a method that generates a high-resolution still image at an arbitrary timing from a movie by utilizing a pixel shift method. For example, JP-A-2009-124621 and JP-A-2008-243037 disclose a method that generates (synthesizes) a high-resolution image from low-resolution images acquired using the pixel shift method.

SUMMARY

According to one aspect of the invention, there is provide an image processing device comprising:

a storage section that stores a plurality of low-resolution frame images when an image of an object is sampled while sequentially shifting a pixel so that overlap occurs, an imaging operation is performed by an image sensor while sequentially shifting the pixel, and a light-receiving value of the pixel obtained by each imaging operation is acquired as the low-resolution frame image;

an estimation calculation section that estimates estimated pixel values at a pixel pitch smaller than a pixel pitch of the low-resolution frame image based on the plurality of the low-resolution frame images stored in the storage section; and an image output section that outputs a high-resolution frame image that has a resolution higher than that of the plurality of low-resolution frame images based on the estimated pixel values estimated by the estimation calculation section, the pixel being shifted to be sequentially set at a first position and a second position subsequent to the first position so that the pixel set at the first position and the pixel set at the second position overlap each other, and the estimation calculation section calculating a difference between the light-receiving value of the pixel set at the first position and the light-receiving value of the pixel set at the second position, and estimating the estimated pixel values based on the difference.

According to another aspect of the invention, there is provided an imaging device comprising:

an image sensor;

an imaging optical system that forms an image of an object on the image sensor;

a pixel shift control section that performs a control process so that the image of the object is sampled while sequentially shifting a pixel so that overlap occurs;

a storage section that stores a light-receiving value of the pixel as a low-resolution frame image, the light-receiving value of the pixel being obtained by each imaging operation of the image sensor while shifting the pixel;

an estimation calculation section that estimates estimated pixel values at a pixel pitch smaller than a pixel pitch of the low-resolution frame image based on the plurality of the low-resolution frame images stored in the storage section; and an image output section that outputs a high-resolution frame image which has a resolution higher than that of the plurality of low-resolution frame images based on the estimated pixel values estimated by the estimation calculation section, the pixel being shifted to be sequentially set at a first position and a second position subsequent to the first position so that the pixel set at the first position and the pixel set at the second position overlap each other, and the estimation calculation section calculating a difference between the light-receiving value of the pixel set at the first position and the light-receiving value of the pixel set at the second position, and estimating the estimated pixel values based on the difference.

According to another aspect of the invention, there is provided an information storage device stores a program, the program causing a computer to function as:

a storage section that stores a plurality of low-resolution frame images when an image of an object is sampled while sequentially shifting a pixel so that overlap occurs, an imaging operation is performed by an image sensor while sequentially shifting the pixel, and a light-receiving value of the pixel obtained by each imaging operation is acquired as the low-resolution frame image;

an estimation calculation section that estimates estimated pixel values at a pixel pitch smaller than a pixel pitch of the low-resolution frame image based on the plurality of the low-resolution frame images stored by the storage section; and an image output section that outputs a high-resolution frame image that has a resolution higher than that of the low-resolution frame image based on the estimated pixel values estimated by the estimation calculation section, the pixel being shifted to be sequentially set at a first position and a second position subsequent to the first position so that the pixel set at the first position and the pixel set at the second position overlap each other, and the estimation calculation section calculating a difference between the light-receiving value of the pixel set at the first position and the light-receiving value of the pixel set at the second position, and estimating the estimated pixel values based on the difference.

According to another aspect of the invention, there is provided an image processing method comprising:

storing a plurality of low-resolution frame images in a storage section when an image of an object is sampled while sequentially shifting a pixel so that overlap occurs, an imaging operation is performed by an image sensor while sequentially shifting the pixel, and a light-receiving value of the pixel obtained by each imaging operation is acquired as the low-resolution frame image;

estimating estimated pixel values at a pixel pitch smaller than a pixel pitch of the low-resolution frame image based on the plurality of the stored low-resolution frame images;

outputting a high-resolution frame image that has a resolution higher than that of the plurality of low-resolution frame images based on the estimated pixel values; and calculating a difference between a light-receiving value of the pixel set at a first position and a light-receiving value of the pixel set at a second position, and estimating the estimated pixel values based on the difference when the pixel is shifted to be sequentially set at the first position and the second position subsequent to the first position, the pixel set at the first position and the pixel set at the second position overlapping each other.

BRIEF DESCRIPTION OF THE DRAWINGS

FIG. 29 is a view illustrating a second color image estimation method.

DESCRIPTION OF EXEMPLARY EMBODIMENTS

Figure 1:
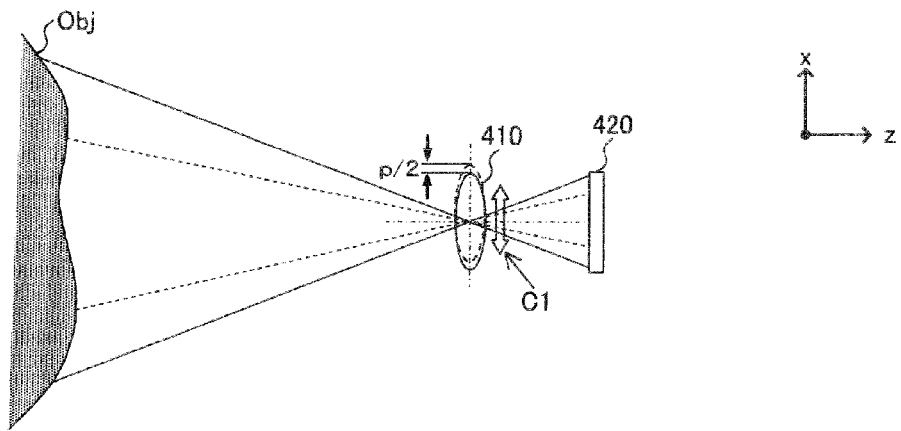
FIG. 1 illustrates a basic configuration example of an imaging device.

Several embodiments of the invention may provide an image processing device, an imaging device, an information storage medium, an image processing method, and the like that can acquire a high-resolution image from a low-resolution movie using a simple process.

According to one embodiment of the invention, there is provided an image processing device comprising:

a storage section that stores a plurality of low-resolution frame images when an image of an object is sampled while sequentially shifting a pixel so that overlap occurs, an imaging operation is performed by an image sensor while sequentially shifting the pixel, and a light-receiving value of the pixel obtained by each imaging operation is acquired as the low-resolution frame image;

an estimation calculation section that estimates estimated pixel values at a pixel pitch smaller than a pixel pitch of the low-resolution frame image based on the plurality of the low-resolution frame images stored in the storage section; and an image output section that outputs a high-resolution frame image that has a resolution higher than that of the plurality of low-resolution frame images based on the estimated pixel values estimated by the estimation calculation section, the pixel being shifted to be sequentially set at a first position and a second position subsequent to the first position so that the pixel set at the first position and the pixel set at the second position overlap each other, and the estimation calculation section calculating a difference between the light-receiving value of the pixel set at the first position and the light-receiving value of the pixel set at the second position, and estimating the estimated pixel values based on the difference.

According to one embodiment of the invention, the imaging operation is performed by the image sensor while sequentially shifting each pixel so that overlap occurs, and the light-receiving value of each pixel is obtained by each imaging operation to acquire a low-resolution frame image. The estimated pixel values are estimated based on the light-receiving values obtained while sequentially shifting each pixel, and a high-resolution frame image is output based on the estimated pixel values. The estimated pixel values are estimated based on the difference between the light-receiving value of each pixel set at the first position and the light-receiving value of each pixel set at the second position. This makes it possible to acquire a high-resolution image from a low-resolution movie using a simple process, for example.

In the image processing device, the estimation calculation section may estimate the first intermediate pixel value and the second intermediate pixel value using a relational expression, and may calculate the estimated pixel values using the estimated first intermediate pixel value, and the relational expression may express a relation between a first intermediate pixel value and a second intermediate pixel value using the difference, the first intermediate pixel value being a light-receiving value of a first light-receiving area that is obtained by excluding the overlapping area from the pixel set at the first position, and the second intermediate pixel value being a light-receiving value of a second light-receiving area that is obtained by excluding the overlapping area from the pixel set at the second position.

This makes it possible to estimate the intermediate pixel values from the light-receiving values obtained while sequentially shifting each pixel so that overlap occurs, and calculate the final estimated pixel values from the estimated intermediate pixel values. Therefore, it is possible to easily estimate the pixel values of the high-resolution frame image.

In the image processing device, the relational expression may express a relation between intermediate pixel values of an intermediate pixel value pattern using the light-receiving value of the pixel, the intermediate pixel value pattern including consecutive intermediate pixel values that include the first intermediate pixel value and the second intermediate pixel value, the estimation calculation section may compare the intermediate pixel value pattern expressed by the relational expression of the intermediate, pixel values and the light-receiving values of the pixel to evaluate a similarity between the intermediate pixel value pattern and the light-receiving values, and the estimation calculation section may determine the intermediate pixel values of the intermediate pixel value pattern based on the evaluated similarity so that the similarity becomes a maximum.

This makes it possible to estimate the intermediate pixel values based on the light-receiving values obtained while shifting each pixel so that overlap occurs.

In the image processing device, the estimation calculation section may calculate an evaluation function that indicates an error between the intermediate pixel value pattern expressed by the relational expression of the intermediate pixel values and the light-receiving values of the pixel, and may determine the intermediate pixel values of the intermediate pixel value pattern so that a value of the evaluation function becomes a minimum.

This makes it possible to determine the intermediate pixel values so that the similarity between the intermediate pixel value pattern and the light-receiving values becomes a maximum by determining the intermediate pixel values so that the value of the evaluation function becomes a minimum.

In the image processing device, a relationship between the light-receiving values of the pixel and the intermediate pixel value pattern may be acquired as prior information based on a known high-resolution frame image, the prior information specifying the similarity between the light-receiving values of the pixel and the intermediate pixel value pattern in advance, and the estimation calculation section may evaluate the similarity between the intermediate pixel value pattern expressed by the relational expression of the intermediate pixel values and the light-receiving values of the pixel based on the prior information.

This makes it possible to evaluate the similarity based on the prior information acquired based on a known high-resolution frame image, and determine the intermediate pixel values based on the evaluation result.

In the image processing device, the estimation calculation section may have a neural network that utilizes a node weighting coefficient obtained by learning based on the known high-resolution frame image as the prior information, the neural network may receive the intermediate pixel value pattern and the light-receiving values of the pixel, and may output the evaluated similarity, and the estimation calculation section may determine each intermediate pixel value included in the intermediate pixel value pattern based on the evaluated similarity evaluation result output from the neural network.

This makes it possible to evaluate the similarity based on the prior information by utilizing the neural network that utilizes the node weighting coefficient as the prior information.

The image processing device may further comprise an interpolation section that interpolates a light-receiving value between the light-receiving values of the pixel set at the plurality of positions in each frame in case where the pixel is shifted every frame so that the pixel is sequentially set at a plurality of positions, and is set at an identical position every multiple frames, the plurality of low-resolution frame images are consecutive low-resolution frame images that are acquired in time series corresponding to the plurality of positions, the interpolation section may interpolate the light-receiving value of the pixel at a missing position in an interpolation target frame in the consecutive low-resolution frame images by a time-axis interpolation process using the light-receiving values of the pixel in frames that respectively precedes or follows the interpolation target frame, in the consecutive low-resolution frame images, and the estimation calculation section may estimate the estimated pixel values in each frame based on the consecutive low-resolution frame images subjected to the time-axis interpolation process performed by the interpolation section.

This makes it possible to acquire the light-receiving values while shifting each pixel, interpolate the light-receiving value at the missing position using the acquired light-receiving values, and calculate the estimated pixel values from the light-receiving value obtained by the interpolation process.

In the image processing device, the interpolation section may perform the time-axis interpolation process using a time-axis interpolation filtering process.

This makes it possible to perform the time-axis interpolation process using the time-axis interpolation filtering process.

In the image processing device, the interpolation section may interpolate the light-receiving value of the pixel at the missing position in the interpolation target frame using the light-receiving values of the pixel at positions identical with the missing position in the frame that precedes the interpolation target frame and the frame that follows the interpolation target frame when a difference in the light-receiving value of the pixel between the frames that respectively precede or follow the interpolation target frame is smaller than a given threshold value, and the interpolation section may interpolate the light-receiving value of the pixel at the missing position in the interpolation target frame using light-receiving values acquired in the interpolation target frame when the difference in the light-receiving values of the pixel in the frame that precedes the interpolation target frame and in the frame that follows the interpolation target frame is larger than the given threshold value.

This makes it possible to perform the time-axis interpolation process on the light-receiving value in the interpolation target frame corresponding to the difference between the light-receiving values of each pixel in the frames that respectively precede or follow the interpolation target frame.

In the image processing device, a first pixel and a second pixel may be adjacent to each other, the first pixel set at the first position and the first pixel set at the second position overlapping each other in a first overlapping area, and the second pixel set at the first position and the second pixel set at the second position overlapping each other in a second overlapping area, and the estimation calculation section may estimate a first intermediate pixel value and a second intermediate pixel value, the first intermediate pixel value being a light-receiving value of a first light-receiving area that is obtained by removing the first overlapping area from the first pixel set at the first position, the second intermediate pixel value being a light-receiving value of the second light-receiving area that is obtained by removing the first overlapping area from the first pixel set at the second position, the estimation calculation section may set a third intermediate pixel value to be an unknown, the third intermediate pixel value being a light-receiving value of the third light-receiving area that is obtained by removing the second overlapping area from the second pixel set at the first position, the estimation calculation section may express a fourth intermediate pixel value using a relational expression using the unknown, the fourth intermediate pixel value being a light-receiving value of a fourth light-receiving area that is obtained by removing the second overlapping area from the second pixel set at the second position, the estimation calculation section may set a search range of the unknown based on the second intermediate pixel value that has been calculated as an intermediate pixel value of a second light-receiving area that is identical with a third light-receiving area, and the estimation calculation section may calculate the unknown within the search range by a search process to estimate the third intermediate pixel value.

This makes it possible to set the search range of an unknown that is subsequently estimated, based on the calculated second intermediate pixel value.

In the image processing device, a first pixel and a second pixel may be adjacent to each other, the first pixel set at the first position and the first pixel set at the second position overlapping each other in a first overlapping area, and the second pixel set at the first position and the second pixel set at the second position overlapping each other in a second overlapping area, and the estimation calculation section may estimate a first intermediate pixel value pattern that includes consecutive intermediate pixel values that include a first intermediate pixel value and a second intermediate pixel value, the first intermediate pixel value being a light-receiving value of a first light-receiving area that is obtained by removing the first overlapping area from the first pixel set at the first position, the second intermediate pixel value being a light-receiving value of the second light-receiving area that is obtained by removing the first overlapping area from the first pixel set at the second position, the estimation calculation section may estimate a second intermediate pixel value pattern that includes consecutive intermediate pixel values that include a third intermediate pixel value and a fourth intermediate pixel value, the third intermediate pixel value being a light-receiving value of the third light-receiving area that is obtained by removing the second overlapping area from the second pixel set at the first position, the fourth intermediate pixel value being a light-receiving value of a fourth light-receiving area that is obtained by removing the second overlapping area from the second pixel set at the second position, the estimation calculation section may estimate a third intermediate pixel value pattern that includes consecutive intermediate pixel values that include a fifth intermediate pixel value, and do not include the first intermediate pixel value and the fourth intermediate pixel value, the fifth intermediate pixel value being a light-receiving value of a fifth light-receiving area that is an overlapping area of the first pixel set at the second position and the second pixel set at the first position, and the estimation calculation section may determine an intermediate pixel value of an identical light-receiving area based on the second intermediate pixel value, the third intermediate pixel value, and the fifth intermediate pixel value obtained by estimating the first intermediate pixel value pattern, the second intermediate pixel value pattern, and the third intermediate pixel value pattern, the identical light-receiving area being the second light-receiving area, the third light-receiving area, and the fifth light-receiving area.

This makes it possible to determine the final intermediate pixel value of the light-receiving area based on three estimated values obtained by estimating the intermediate pixel value of an identical light-receiving area three times.

In the image processing device, the estimation calculation section may perform a filtering process on the estimated pixel values using different filtering coefficients depending on pixel positions that respectively correspond to the estimated pixel values.

This makes it possible to perform the filtering process on the estimated pixel values corresponding to the pixel position.

In the image processing device, the pixel may be shifted in a diagonal direction so that the pixel at the first position overlaps the pixel at the second position to acquire the low-resolution frame images; and the estimation calculation section may estimate the light-receiving value of an overlapping area of the pixel shifted in the diagonal direction as the estimated pixel values.

This makes it possible to calculate the light-receiving value of the overlapping area of each pixel as the estimated pixel value based on the light-receiving values acquired while shifting each pixel in the diagonal direction so that overlap occurs.

In the image processing device, the image sensor may be a color image sensor, and the pixel may be shifted in three steps in a horizontal direction and a vertical direction, respectively, the low-resolution frame images may be acquired as 16-frame mosaic images of each color component, and the estimation calculation section may estimate the estimated pixel values corresponding to all pixels of the high-resolution frame image on each color component based on the 16-frame mosaic images of each color component.

In the image processing device, the image sensor may be a color image sensor, and the pixel may be shifted in one step in a horizontal direction and a vertical direction, the low-resolution frame images may be acquired as 4-frame mosaic images of each color component, and the estimation calculation section may perform a demosaicing process to the 4-frame mosaic images of each color component, and may estimate the estimated pixel values based on images obtained by the demosaicing process.

This makes it possible to estimate the estimated pixel values based on the light-receiving values acquired while shifting each pixel, and output a color high-resolution frame image when the image sensor is a color image sensor.

Exemplary embodiments of the invention are described in detail below. Note that the following exemplary embodiments do not in any way limit the scope of the invention defined by the claims laid out herein. Note also that all of the elements described in connection with the following exemplary embodiments should not necessarily be taken as essential elements of the invention.

1. Comparative Example

A comparative example is described below. A digital camera that is mainly used to shoot a still image may also have a movie shooting function, or a video camera that is mainly used to shoot a movie may also have a still image shooting function.

Such a camera is normally designed so that the user selects a still image shooting mode or a movie shooting mode, A camera that allows the user to shoot a high-resolution still image at a high frame rate almost equal to that of a movie has been known. The user can perform high-speed continuous shooting using such a camera. These cameras are convenient to the user since the user can shoot a still image and a movie using a single camera.

However, the above method has a problem in that it is difficult for many users to shoot a high-quality still image without missing the best shot. For example, when using a method that instantaneously changes the shooting mode to a high-quality still image shooting mode when shooting a movie, the movie may be interrupted, or the user may have missed the best moment when the user has become aware that it is possible to take the best shot.

In order to prevent a situation in which the user misses the best shot, each scene may be shot as a movie, and the best moment may be arbitrarily acquired (captured) from the movie as a high-quality still image. When implementing such a method, it is necessary to shoot a high-resolution image at a high frame rate.

However, it is difficult to shoot a high-resolution image at a high frame rate. For example, it is necessary to use an image sensor that can implement ultrafast imaging, a processing circuit that processes image data at an ultrahigh speed, an ultrahigh-speed data compression function, and a recording means that can record a huge amount of data in order to successively shoot 12-megapixel images at a frame rate of 60 frames per second (fps). In this case, it is necessary to employ a plurality of image sensors, parallel processing, a large-capacity memory, a high-performance heat dissipation mechanism, and the like. However, these means are not realistic for consumer products for which a reduction in size and cost is desired. It is possible to obtain a low-quality still image having a resolution almost equal to that of a High-Vision movie (2 megapixels). However, a resolution almost equal to that of a High-Vision movie is not sufficient for a still image.

A movie may be shot at a high frame rate by utilizing a high-resolution image sensor that can capture a high-resolution image, and reducing the resolution of the image by performing a pixel thin-out readout process or an adjacent pixel addition readout process to reduce the amount of data read at one time. However, it is impossible to shoot a high-resolution image at a high frame rate using such a method.

In order to solve the above problem, it is necessary to obtain a high-resolution image from low-resolution images that have been shot at a high frame rate. A high-resolution image may be obtained from low-resolution images by performing a super-resolution process on low-resolution images that have been shot while shifting each pixel to generate a high-resolution image, for example.

For example, a method that utilizes an addition readout process may be employed. More specifically, a plurality of low-resolution images are sequentially read while performing a position shift process, and a high-resolution image is estimated based on the plurality of low-resolution images that are shifted in position. A low-resolution image is generated by causing the estimated high-resolution image to deteriorate, and is compared with the original low-resolution image. The high-resolution image is modified so that the difference between the generated low-resolution image and the original low-resolution image becomes a minimum to estimate a high-resolution image. The maximum-likelihood (ML) technique, the maximum a posteriori (MAP) technique, the projection onto convex sets (POCS) technique, the iterative back projection (IBP) technique, and the like have been known as a technique that implements the super-resolution process.

The method disclosed in JP-A-2009-124621 utilizes the super-resolution process. According to the method disclosed in JP-A-2009-124621, low-resolution images are sequentially shot in time series while shifting each pixel when shooting a movie, and are synthesized to estimate a high-resolution image. The super-resolution process is performed on the estimated high-resolution image to estimate a high-resolution image with high likelihood.

However, the method disclosed in JP-A-2009-124621 utilizes a general super-resolution process that increases the estimation accuracy by repeating calculations that require heavy use of a two-dimensional filter. Therefore, it is difficult to apply the method disclosed in JP-A-2009-124621 to a product that is limited in terms of processing capacity and cost due to an increase in the amount of processing or an increase in processing time. For example, since the scale of a processing circuit necessarily increases when applying the method disclosed in JP-A-2009-124621 to a small portable imaging device such as a digital camera, an increase in power consumption, generation of a large amount of heat, a significant increase in cost, and the like occur.

The method disclosed in JP-A-2008-243037 generates a high-resolution image using a plurality of low-resolution images obtained while shifting each pixel. The method disclosed in JP-A-2008-243037 estimates the pixel value of a sub-pixel (i.e., a pixel of the desired high-resolution image) so that the average value of the pixel values of the sub-pixels coincides with the pixel value of the low-resolution image. The pixel value is estimated by setting the initial value of a plurality of sub-pixels, subtracting the pixel value of each sub-pixel other than the calculation target sub-pixel from the pixel value of the low-resolution image to calculate a pixel value, and sequentially applying the calculated pixel value to the adjacent pixels.

However, the method disclosed in JP-A-2008-243037 has a problem in that an estimation error increases to a large extent when the initial value is not successfully specified. In the method disclosed in JP-A-2008-243037, an area in which a change in pixel value of the sub-pixels is small and the average value of the pixel values of the sub-pixels is almost equal to the pixel value of the pixel of the low-resolution image that covers the sub-pixels is found from the image when setting the initial value. Therefore, it is difficult to estimate the initial value when an area appropriate for setting the initial value cannot be found from the image. Moreover, the method disclosed in JP-A-2008-243037 requires a process that searches for an area appropriate for setting the initial value.

2. Pixel Shift

According to several embodiments of the invention, a low-resolution movie is shot at a high frame rate while shifting each pixel, and a high-resolution image is generated from the low-resolution movie using a simple pixel estimation method. A high-resolution still image at an arbitrary timing of the movie, or a high-resolution movie at a high frame rate is acquired using the generated high-resolution image.

The methods according to several embodiment of the invention are described in detail below with reference to the drawings. A pixel shift method employed in several embodiments of the invention is described below with reference to FIG. 1. FIG. 1 schematically illustrates a basic configuration example of an imaging device. The imaging device illustrated in FIG. 1 includes a lens 410 (imaging optical system in a broad sense) and an image sensor 420 (sensor or imager).

The lens 410 forms an image of an object Obj in a light-receiving plane of the image sensor 420. A lens driver section (not illustrated in FIG. 1) performs a pixel shift control process on the lens 410 (see C1). The pixel pitch of the image sensor 420 is referred to as p. The lens 410 is shifted (moved) by a shift amount p/2 (shift amount s (s<p) in a broad sense) in the direction along an x-axis (or y-axis) that perpendicularly intersects the optical axis. The image of the object formed in the light-receiving plane is also shifted by the shift amount p12 when the lens 410 is shifted by the shift amount p/2.

The image sensor 420 captures the image of the object Obj formed by the lens 410. More specifically, the image sensor 420 captures the image of the object each time the lens 410 is shifted to sample the image of the object that is shifted by the shift amount p/2. Low-resolution frame images which have a pixel pitch of p and of which each pixel is shifted by the shift amount p/2 are thus acquired.

Note that the image sensor 420 may be shifted by the shift amount p/2 instead of shifting the lens 410 by the shift amount p/2.

3. First Estimation Method

In one embodiment of the invention, the pixel values at a pixel pitch of p/2 are estimated from the low-resolution frame images (pixel pitch: p) that have been acquired as described above to generate a high-resolution frame image. A method that estimates the pixel values at a pixel pitch of p/2 is described below with reference to FIGS. 2 to 10. Note that the pixel value acquired by each pixel of the image sensor is referred to as "light-receiving value", and the pixel value obtained by estimation is referred to as "estimated pixel value" for convenience of explanation.

Figure 2:
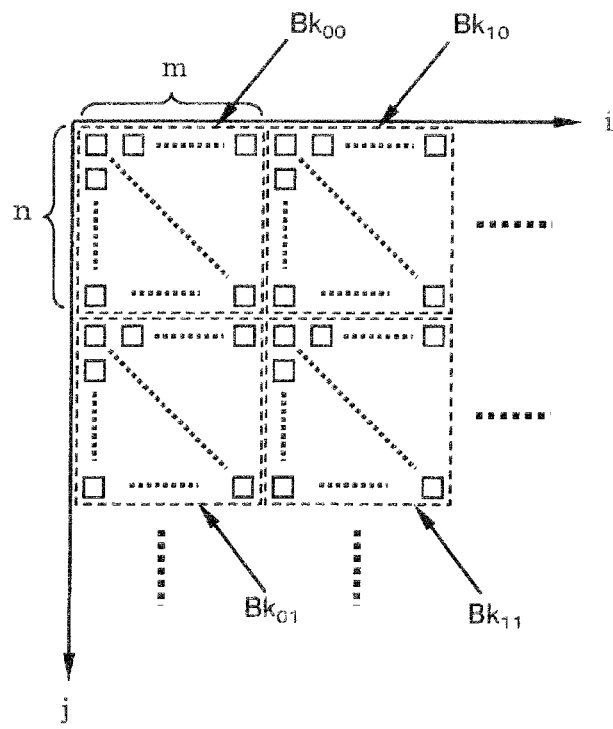
FIG. 2 is a view illustrating an estimation block.

FIG. 2 is a view illustrating an estimation block that is used for a pixel value estimation process. In FIG. 2, each pixel of the low-resolution frame image is indicated by a square solid line, the pixel position in the horizontal direction is indicated by i, and the pixel position in the vertical direction is indicated by j (i and j are natural numbers).

As illustrated in FIG. 2, estimation blocks $Bk_{00}$, $Bk_{10}$, ... are set so that each estimation block includes m×n pixels. The pixel value estimation process is performed on an estimation block basis. The estimation process estimates the estimated pixel values of 2m×2n pixels from the pixel values of m×n pixels. An example in which the estimated pixel values of 2×2 pixels are estimated from the pixel values of a 1×1 m×n) pixel is described below for convenience of explanation.

Figure 3A:
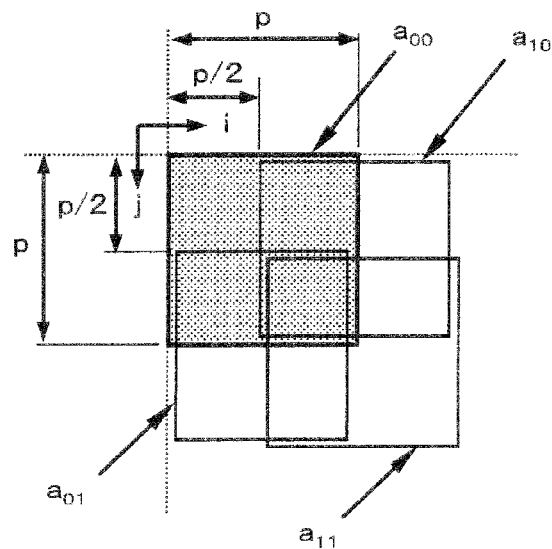
FIG. 3A is a view illustrating a light-receiving value.
Figure 3B:
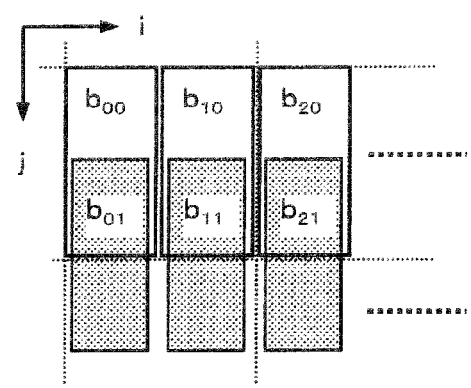
FIG. 3B is a view illustrating an intermediate pixel value.

FIGS. 3A and 3B are views illustrating the light-receiving value and an intermediate pixel value used for the estimation process. As illustrated in FIG. 3A, light-receiving values $a_{00}$, $a_{10}$, $a_{11}$, and $a_{01}$ (pixel values) are sequentially acquired while shifting each pixel (light-receiving unit) (pixel pitch: p (=pixel pitch of the image sensor)) by the shift amount p/2. The estimated pixel values at a pixel pitch of p/2 are estimated from the four light-receiving values. Note that the light-receiving values $a_{00}$ to $a_{11}$ may be light-receiving values acquired by the imaging operation, or may be light-receiving values obtained (interpolated) by a time-axis interpolation process (described later).

As illustrated in FIG. 3B, intermediate pixel values $b_{00}$ to $b_{21}$ (intermediate estimated pixel values) (pixel pitch in the horizontal direction: p/2) are estimated from the light-receiving values $a_{00}$ to $a_{11}$. The estimated pixel values (pixel pitch in the vertical direction and the horizontal direction: p/2) are estimated from the intermediate pixel values $b_{00}$ to $b_{21}$.

Figure 4:
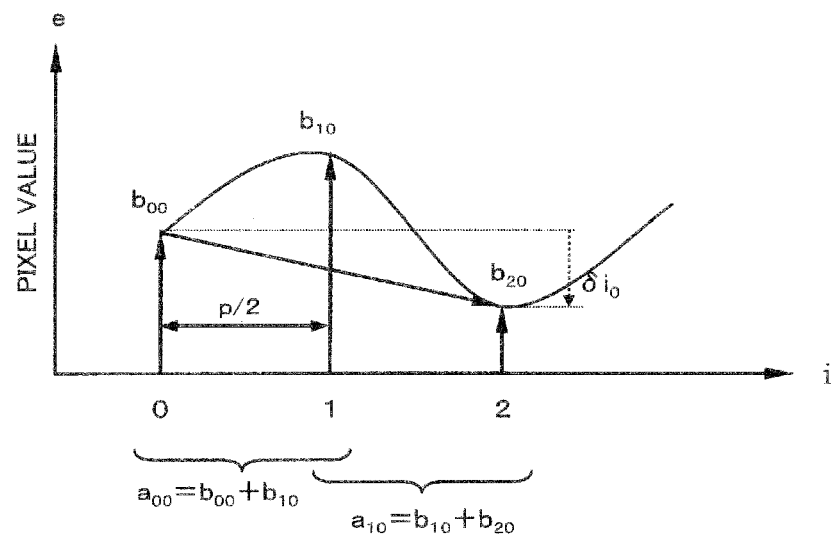
FIG. 4 is a view illustrating an intermediate pixel value estimation method according to a first estimation method.

The intermediate pixel value estimation method is described below using the intermediate pixel values $b_{00}$ to $b_{20}$ in the first row arranged in the horizontal direction (see FIG. 4). The light-receiving value and the intermediate pixel value have the relationship shown by the following expression (1).

$$a_{00} = b_{00} + b_{10},$$

$$a_{10} = b_{10} + b_{20} \tag{1}$$

The intermediate pixel values $b_{10}$ and $b_{20}$ can be expressed as a function of the intermediate pixel value $b_{00}$ by transforming the expression (1) where the intermediate pixel value $b_{00}$ is an unknown (initial value or reference value) (see the following expression (2)).

$$b_{00} = (\text{unknown}),$$

$$b_{10} = a_{00} - b_{00},$$

$$b_{20} = b_{00} + \delta i_0 = b_{00} + (a_{10} - a_{00}) \tag{2}$$

Note that $\delta i_0$ is the difference between the light-receiving values shifted by one shift, and corresponds to the difference between the intermediate pixel values $b_{20}$ and $b_{00}$ (see the following expression (3)).

$$\delta i_0 = a_{10} - a_{00} \tag{3}$$
$$= (b_{10} + b_{20}) - (b_{00} + b_{10})$$
$$= b_{20} - b_{00}$$

A combination pattern of the high-resolution intermediate pixel values {$b_{00}$, $b_{10}$, and $b_{20}$} is thus calculated where the intermediate pixel value $b_{00}$ is an unknown. It is necessary to calculate the unknown ($b_{00}$) in order to determine each intermediate pixel value expressed as a function of the intermediate pixel value $b_{00}$.

Figure 5:
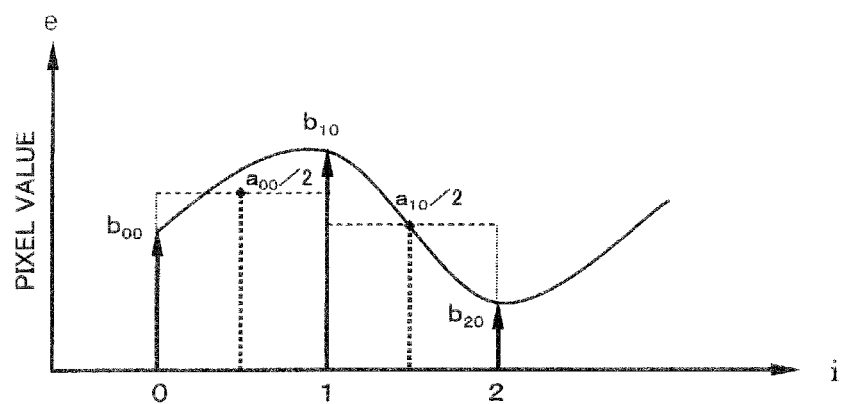
FIG. 5 is a view illustrating an intermediate pixel value estimation method according to a first estimation method.

As illustrated in FIG. 5, the pixel value pattern {$a_{00}$, $a_{10}$} detected by overlap shift sampling (pixel shift) is compared with the intermediate pixel value pattern {$b_{00}$, $b_{10}$, $b_{20}$}. An unknown ($b_{00}$) that minimizes the error is derived, and set as the intermediate pixel value $b_{00}$.

Figure 6:
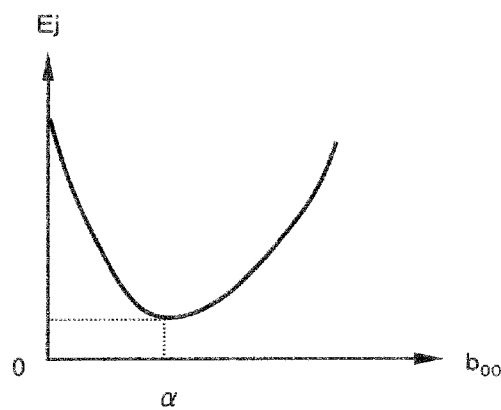
FIG. 6 is a view illustrating an intermediate pixel value estimation method according to a first estimation method.

More specifically, an error evaluation function Ej is expressed as a function of the unknown ($b_{00}$) (see the following expression (4)). As illustrated in FIG. 6, an unknown α (=$b_{00}$) at which the value of the evaluation function Ej becomes a minimum (minimum value) is calculated by a search process (least-square method).

$$e_{ij} = \left(\frac{a_{ij}}{2} - b_{ij}\right)^2 + \left(\frac{a_{ij}}{2} - b_{(i+1)j}\right)^2, \quad (4)$$

$$Ej = \sum_{i=0}^{1} e_{ij}$$

In one embodiment of the invention, an error between the average value of the intermediate pixel values and the pattern {$a_{00}$, $a_{10}$} containing a low-frequency component is evaluated (see the expression (4)). This makes it possible to prevent a situation in which a pattern that contains a large amount of high-frequency components is derived as an estimated solution of the intermediate pixel values {$b_{00}$, $b_{10}$, $b_{20}$}. More specifically, an image that contains a large amount of low-frequency components is generated even if the unknown is estimated incorrectly. Therefore, it is possible to prevent a situation in which a pattern is generated so that a high-frequency component that tends to produce unnaturalness as compared with a low-frequency component contains an error, so that a natural image can be obtained. A reasonable pixel estimation process can thus be performed on a natural image that contains a small amount of high-frequency components as compared with low-frequency components.

The intermediate pixel value $b_{00}$ thus estimated is substituted into the expression (2) to determine the intermediate pixel values $b_{10}$ and $b_{20}$. The intermediate pixel values $b_{01}$ to $b_{21}$ in the second row are similarly estimated where the intermediate pixel value $b_{01}$ is an unknown.

Figure 7A:
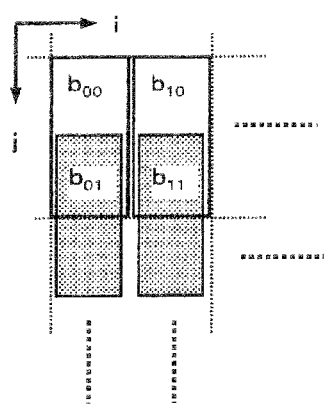
FIGS. 7A and 7B are views illustrating an estimated pixel value estimation method according to a first estimation method.
Figure 7B:
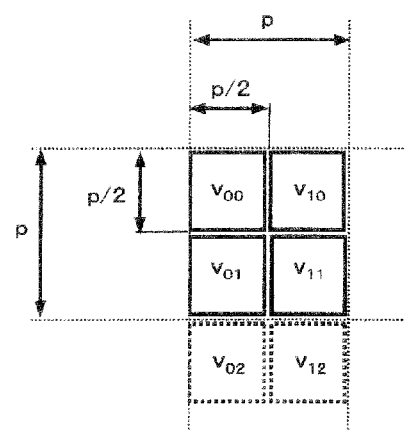
Figure 8:
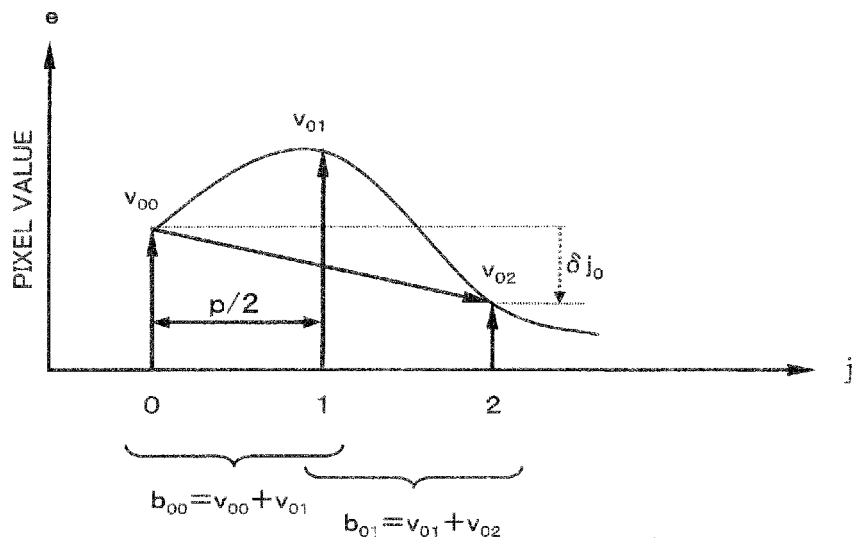
FIG. 8 is a view illustrating an estimated pixel value estimation method according to a first estimation method.

The estimated pixel values $v_{ij}$ are calculated as described below using the estimated intermediate pixel values $b_{ij}$. FIGS. 7A and 7B are views schematically illustrating the intermediate pixel value and the estimated pixel value. As illustrated in FIG. 7A, an estimation process is performed using the intermediate pixel values $b_{00}$ to $b_{11}$ (two columns) among the intermediate pixel values $b_{00}$ to $b_{21}$ (three columns) estimated by the above method. As illustrated in FIG. 7B, estimated pixel values $v_{00}$ to $v_{12}$ at a pixel pitch of p/2 are estimated from the intermediate pixel values $b_{00}$ to $b_{11}$.

The following description is given taking the pixel values $v_{00}$ to $v_{02}$ in the first column (see FIG. 8) as an example for convenience of explanation. The pixel values $v_{00}$ to $v_{02}$ are estimated by a method similar to the intermediate pixel value estimation method. More specifically, the intermediate pixel values $b_{00}$ and $b_{01}$ are equal to values obtained by overlap-sampling the pixel values $v_{00}$ to $v_{02}$ on a two-pixel basis in the vertical direction. Therefore, the intermediate pixel values and the estimated pixel values have the relationship shown by the following expression (5).

$$b_{00}=v_{00}+v_{01},$$

$$b_{01}=v_{01}+v_{02} \quad (5)$$

The pixel values $v_{01}$ and $v_{02}$ can be expressed as a function of an unknown ($v_{00}$) (see the following expression (6)).

$$v_{00}=(\text{unknown}),$$

$$v_{01}=b_{00}-v_{00},$$

$$v_{02}=v_{00}+\delta i_0=v_{00}+(b_{01}-b_{00}) \quad (6)$$

Note that $\delta i_0$ is the difference between the intermediate pixel values shifted by one shift, and corresponds to the difference between the pixel values $v_{02}$ and $v_{00}$ (see the following expression (7)).

$$\delta i_0 = b_{01} - b_{00} \quad (7)$$

$$= (v_{01} + v_{02}) - (v_{00} + v_{01})$$

$$= v_{02} - v_{00}$$

Figure 9:
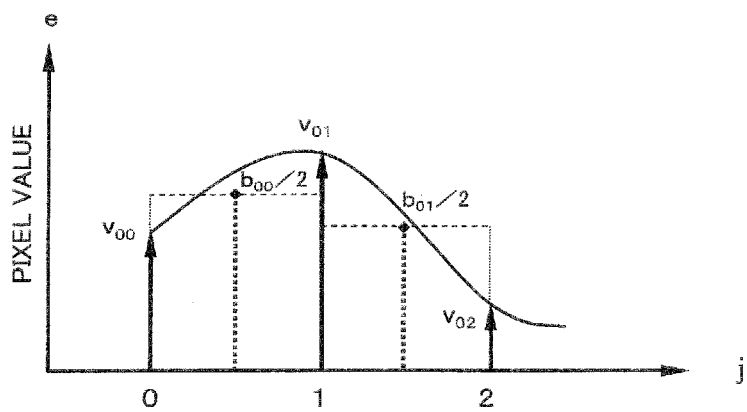
FIG. 9 is a view illustrating an estimated pixel value estimation method according to a first estimation method.
Figure 10:
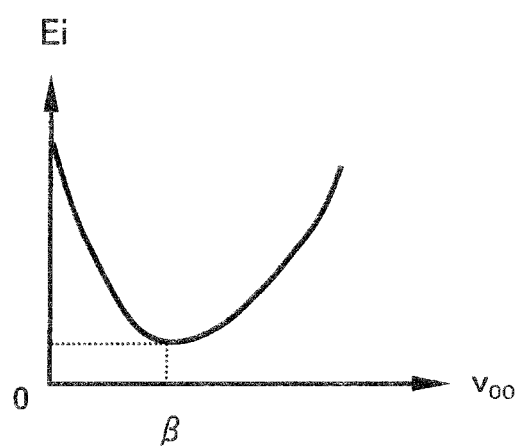
FIG. 10 is a view illustrating an estimated pixel value estimation method according to a first estimation method.

As illustrated in FIG. 9, the unknown ($v_{00}$) is derived so that an error between the intermediate pixel value pattern {$b_{00}$, $b_{10}$} and the estimated pixel value pattern {$v_{00}$, $v_{01}$, $v_{02}$} becomes a minimum. Specifically, an unknown β (=$v_{00}$) at which the value of an error evaluation function Ei (see the following expression (8)) becomes a minimum (see FIG. 10) is calculated by a search process.

$$e_{ij} = \left(\frac{b_{ij}}{2} - v_{ij}\right)^2 + \left(\frac{b_{ij}}{2} - v_{i(j+1)}\right)^2, \quad (8)$$

$$Ei = \sum_{j=0}^{1} e_{ij}$$

The pixel values $v_{10}$ to $v_{12}$ in the second column are calculated in the same manner as described above to determine the final estimated pixel values $v_{00}$, $v_{01}$, $v_{10}$, and $v_{11}$. Note that an appropriate noise reduction process may be performed on the image data having the final estimated pixel values to obtain a display image.

Although an example in which the unknown ($b_{00}$ or $v_{00}$) is calculated by a search process has been described above, the unknown ($b_{00}$ or $v_{00}$) may be calculated directly. Specifically, the expression (4) (i.e., a quadratic function formula of the unknown ($b_{00}$)) that indicates the evaluation function Ej can be transformed into the following expression (9). Therefore, the minimum value a of the unknown ($b_{00}$) at which the value of the evaluation function Ej becomes a minimum can be calculated directly. The minimum value β of the unknown ($v_{00}$) can be similarly calculated.

$$Ej=(b_{00}-\alpha)^2+\xi \quad (9)$$

When using a method that allows the user to select the still image shooting mode or the movie shooting mode, the user may have missed the best moment when the user has become aware that it is possible to take the best shot. When using a method that generates (synthesizes) a high-resolution still image from a low-resolution movie using the super-resolution process, the scale of the processing circuit necessarily increases since the processing load of the super-resolution process is high, for example.

According to one embodiment of the invention, an image of the object is sampled, and the imaging operation is performed by the image sensor while sequentially shifting a pixel so that overlap occurs, and the light-receiving value of the pixel obtained by each imaging operation is acquired as a low-resolution frame image. The acquired low-resolution frame image is stored, and the estimated pixel values at a pixel pitch smaller than the pixel pitch of the low-resolution frame image are estimated based on a plurality of the stored low-resolution frame images. A high-resolution frame image that has a resolution higher than that of the low-resolution frame image is output based on the estimated pixel values. The pixel is shifted to be sequentially set at a first position and a second position subsequent to the first position. The pixel set at the first position and the pixel set at the second position overlap each other. The difference between the light-receiving value of the pixel set at the first position and the light-receiving value of the pixel set at the second position is calculated, and the estimated pixel values are estimated based on the difference.

For example, the pixel is shifted in the horizontal direction or the vertical direction by the shift amount p/2 that is half of the pixel pitch p of the image sensor (see FIG. 1). In this case, the pixel is shifted so that overlap occurs by the shift amount p/2 (see FIG. 3A). The low-resolution frame images that respectively include the light-receiving values $a_{00}$, $a_{10}$, $a_{11}$, and $a_{01}$ are sequentially acquired in the first frame to the fourth frame. The low-resolution frame images are acquired by an imaging device 10, input to an image processing device 20, and stored in a frame buffer 210 (storage section) (see FIG. 26), for example. A pixel value estimation calculation section 230 (estimation calculation section) estimates the estimated pixel values $v_{00}$ to $v_{11}$ at a pixel pitch of p/2 that is smaller than the pixel pitch p, and an anti-aliasing filter 240 (image output section) outputs a high-resolution frame image. As illustrated in FIG. 3A, the pixel is set at the first position in the first frame, and is set at the second position in the second frame, the light-receiving value $a_{00}$ being acquired at the first position, and the light-receiving value $a_{10}$ being acquired at the second position. The pixel set at the first position and the pixel set at the second position overlap each other in an area that has the estimated pixel values $v_{10}$ and $v_{11}$. The difference $\delta i_0$ ($=a_{10}-a_{00}$) is calculated (see FIG. 4A, for example), and the estimated pixel values $v_{00}$ to $v_{11}$ are estimated based on the difference $\delta i_0$).

This makes it possible to acquire a high-resolution image from a movie using a simple process. More specifically, the estimation process can be simplified by estimating the intermediate pixel values using the difference $\delta i_0$. Since a high-resolution still image at an arbitrary timing of the low-resolution movie can be generated, the user can easily obtain a high-resolution still image at the best moment. Moreover, a low-resolution movie (e.g., 3 megapixels) can be shot at a high frame rate (e.g., 60 fps), and a high-resolution still image (12 megapixels) or a High-Vision movie can arbitrarily be displayed. When implementing digital zoom, a high-resolution zoom image can be generated by compensating for a decrease in number of pixels using the estimation process.

More specifically, a relational expression of a first intermediate pixel value and a second intermediate pixel value is expressed using the difference, the first intermediate pixel value being a light-receiving value of a first light-receiving area that is obtained by removing the overlapping area from the pixel set at the first position, and the second intermediate pixel value being a light-receiving value of a second light-receiving area that is obtained by removing the overlapping area from the pixel set at the second position. The first intermediate pixel value and the second intermediate pixel value are estimated using the relational expression, and the pixel value of each pixel is calculated using the estimated first intermediate pixel value.

For example, the first light-receiving area corresponds to the area in which the first intermediate pixel value $b_{00}$ is acquired (see FIGS. 3A and 3B). The second light-receiving area corresponds to the area in which the second intermediate pixel value $b_{20}$ is acquired. The relational expression $b_{20}=b_{00}+\delta i_0$ is calculated using the difference $\delta i_0$ (see FIG. 4). The unknown ($b_{00}$) is estimated, and the intermediate pixel value $b_{20}$ is estimated using the relational expression (see FIG. 5). The estimated pixel values $v_{00}$ and $v_{01}$ are calculated using the intermediate pixel value $b_{00}$ (see FIG. 7A, for example).

The high-resolution image estimation process can be simplified by estimating the intermediate pixel values from the light-receiving values obtained by overlap shift sampling, and calculating the estimated pixel values from the intermediate pixel values. For example, a complex process (e.g., repeated calculations using a two-dimensional filter (Patent Document 1) or a process that searches for an area appropriate for setting the initial value (JP-A-2008-243037)) employed in the comparative example can be made unnecessary.

In one embodiment of the invention, a relational expression of the intermediate pixel values of an intermediate pixel value pattern is expressed using the light-receiving values of the pixel, the intermediate pixel value pattern including consecutive (sequential) intermediate pixel values that include the first intermediate pixel value and the second intermediate pixel value. The intermediate pixel value pattern and the light-receiving value pattern (i.e., the light-receiving values of the pixel) are compared to evaluate similarity, and the intermediate pixel values of the intermediate pixel value pattern are determined based on the evaluation result so that the similarity becomes a maximum.

For example, the consecutive intermediate pixel values $\{b_{00}, b_{10}, b_{20}\}$ correspond to the intermediate pixel value pattern (see FIG. 5), and the relational expression of the intermediate pixel values $\{b_{00}, b_{10}, b_{20}\}$ is expressed using the light-receiving values $a_{00}$ and $a_{10}$ (see the expression (2)). The intermediate pixel value pattern $\{b_{00}, b_{10}, b_{20}\}$ and the light-receiving value pattern $\{a_{00}, a_{10}\}$ are compared, and the intermediate pixel values $\{b_{00}, b_{10}, b_{20}\}$ are determined so that the similarity indicated by the evaluation function Ej becomes a maximum.

Note that the intermediate pixel value pattern is a set of intermediate pixel values that are consecutive in the horizontal direction (or the vertical direction). The light-receiving value pattern is a set of light-receiving values that are consecutive in the horizontal direction (or the vertical direction) in a plurality of low-resolution frame images used for the estimation process.

This makes it possible to estimate the intermediate pixel values based on the light-receiving values obtained while shifting the pixel so that overlap occurs.

More specifically, the evaluation function that indicates an error between the intermediate pixel value pattern (expressed by the relational expression of the intermediate pixel values) and the light-receiving value pattern calculated. The intermediate pixel values of the intermediate pixel value pattern are determined so that the value of the evaluation function becomes a minimum.

For example, the intermediate pixel value pattern $\{b_{00}, b_{10}, b_{20}\}$ is expressed as a function of the unknown ($b_{00}$), and an error between the intermediate pixel value pattern $\{b_{00}, b_{10}, b_{20}\}$ and the light-receiving value pattern $\{a_{00}, a_{10}\}$ is expressed by the evaluation function Ej (see the expression (4), for example). The unknown $\alpha$ ($=b_{00}$) (initial value) at which the value of the evaluation function Ej becomes a minimum is calculated (see FIG. 6), and the intermediate pixel values $b_{00}$ to $b_{20}$ are determined using the calculated intermediate pixel value $b_{00}$.

The intermediate pixel values can thus be estimated by expressing the error using the evaluation function, and calculating the intermediate pixel value that corresponds to the minimum value of the evaluation function. For example, the intermediate pixel estimation initial value can be set using a simple process by calculating the unknown using the least-square method. This makes it unnecessary to search for an image area appropriate for setting the initial value (see the comparative example (JP-A-2008-243037)).

4. Second Estimation Method

The intermediate pixel value $b_{20}$ is also estimated during the estimation process performed on the estimation block set to the intermediate pixel values $b_{00}$ and $b_{10}$ (see FIG. 3B, for example). The intermediate pixel value $b_{20}$ corresponds to an unknown (initial variable) in the next estimation block set to the intermediate pixel values $b_{20}$ and $b_{30}$. The unknown ($b_{20}$) can be quickly estimated by utilizing the estimated intermediate pixel value $b_{20}$.

A second estimation method that can quickly estimate an unknown is described below with reference to FIGS. 11 to 15. The following description illustrates an example in which the intermediate pixel value (e.g., $b_{20}$) is estimated. Note that the estimated pixel value (e.g., $v_{02}$) can also be estimated by the following method.

Figure 11:
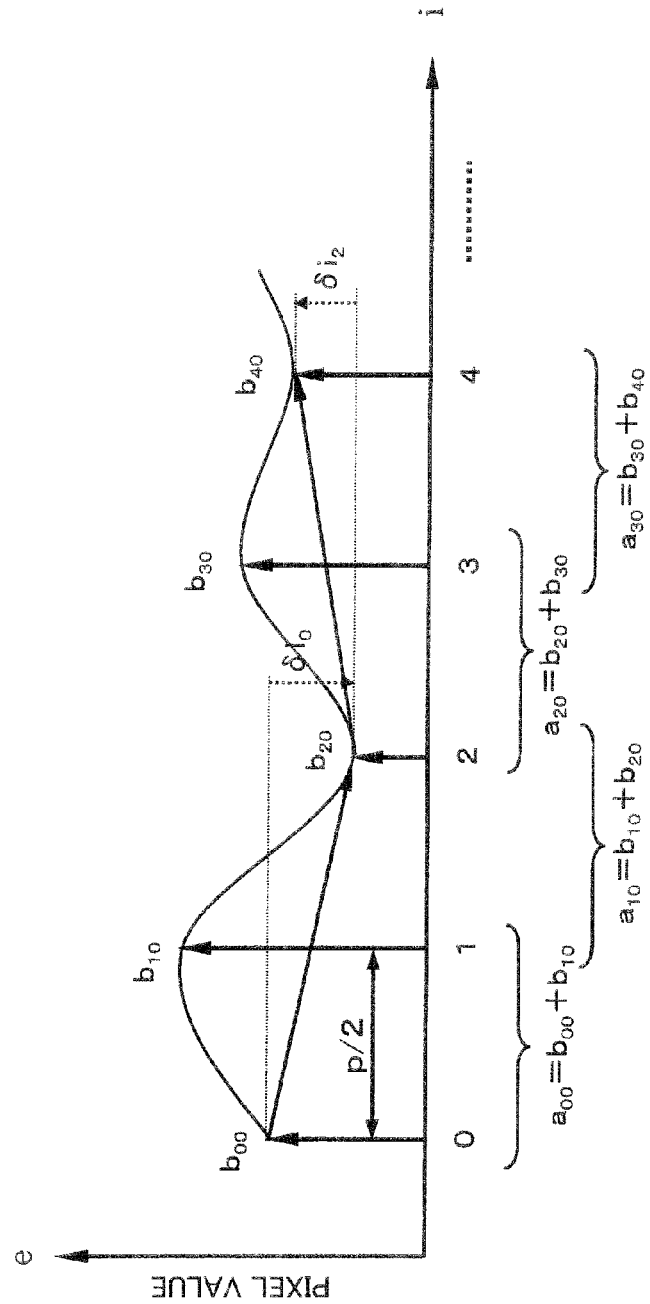
FIG. 11 is a view illustrating a second estimation method.

As illustrated in FIG. 11, the light-receiving values $a_{00}$ and $a_{10}$ in the first row (horizontal direction) detected by overlap shift sampling satisfy the following expression (10).

$$a_{00}=b_{00}++b_{10},$$

$$a_{10}=b_{10}+b_{20} \quad (10)$$

The following expression (11) is satisfied where the intermediate pixel value $b_{00}$ is an unknown.

$$b_{00}=\text{(unknown)},$$

$$b_{10}=a_{00}-b_{00},$$

$$b_{20}=b_{00}+\delta i_0=b_{00}+(a_{10}-a_{00}) \quad (11)$$

$\delta i_0$ is shown by the following expression (12), $$\delta i_0 = a_{10} - a_{00} \quad (12)$$
$$= (b_{10}+b_{20})-(b_{00}+b_{10})$$
$$= b_{20} - b_{00}$$

Figure 12:
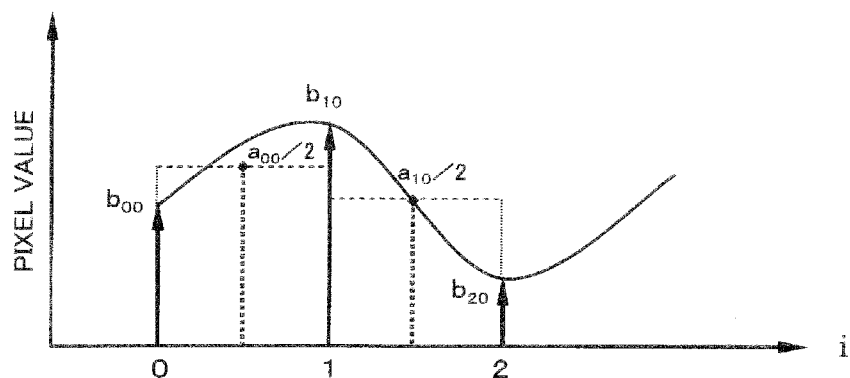
FIG. 12 is a view illustrating a second estimation method.
Figure 13:
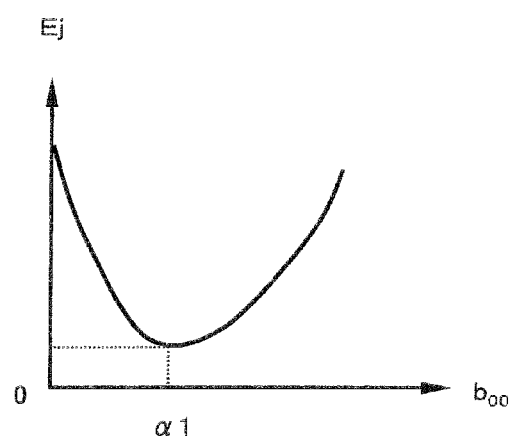
FIG. 13 is a view illustrating a second estimation method.

As illustrated in FIG. 12, the light-receiving value pattern $\{a_{00}, a_{10}\}$ is compared with the intermediate pixel value pattern $\phi_0$ $\{b_{00}, b_{10}, b_{20}\}$. More specifically, the error evaluation function Ej is expressed as a function of the unknown ($b_{00}$) (see the following expression (13)). As illustrated in FIG. 13, an unknown $\alpha 1$ ($=b_{00}$) at which the value of the evaluation function Ej becomes a minimum is calculated by a search process, and the intermediate pixel values $b_{10}$ and $b_{20}$ are determined using the expression (11).

$$e_{ij} = \left(\frac{a_{ij}}{2}-b_{ij}\right)^2 + \left(\frac{a_{ij}}{2}-b_{(i+1)j}\right)^2, \quad (13)$$

$$Ej = \sum_{i=0}^{1} e_{ij}$$

Likewise, the next unknown $b_{20}$ (initial variable) in the horizontal direction is calculated, and the intermediate pixel value pattern $\phi_2$ $\{b_{20}, b_{30}, b_{40}\}$ is calculated. Specifically, the light-receiving values $a_{20}$ and $a_{30}$ satisfy the following expression (14) (see FIG. 14).

$$a_{20}=b_{20}+b_{30},$$

$$a_{30}=b_{30}+b_{40} \quad (14)$$

The following expression (15) is satisfied where the intermediate pixel value $b_{20}$ is an unknown.

$$b_{20}=\text{(unknown)}$$

$$b_{30}=a_{20}-b_{20},$$

$$b_{40}=b_{20}+\delta i_2 b_{20}+(a_{30}-a_{20}) \quad (15)$$

$\delta i_2$ (i.e., the difference between the light-receiving values shifted by one shift) is shown by the following expression (16).

$$\delta i_2 = a_{30} - a_{20} \quad (16)$$
$$= (b_{30}+b_{40})-(b_{20}+b_{30})$$
$$= b_{40} - b_{20}$$

Figure 14:
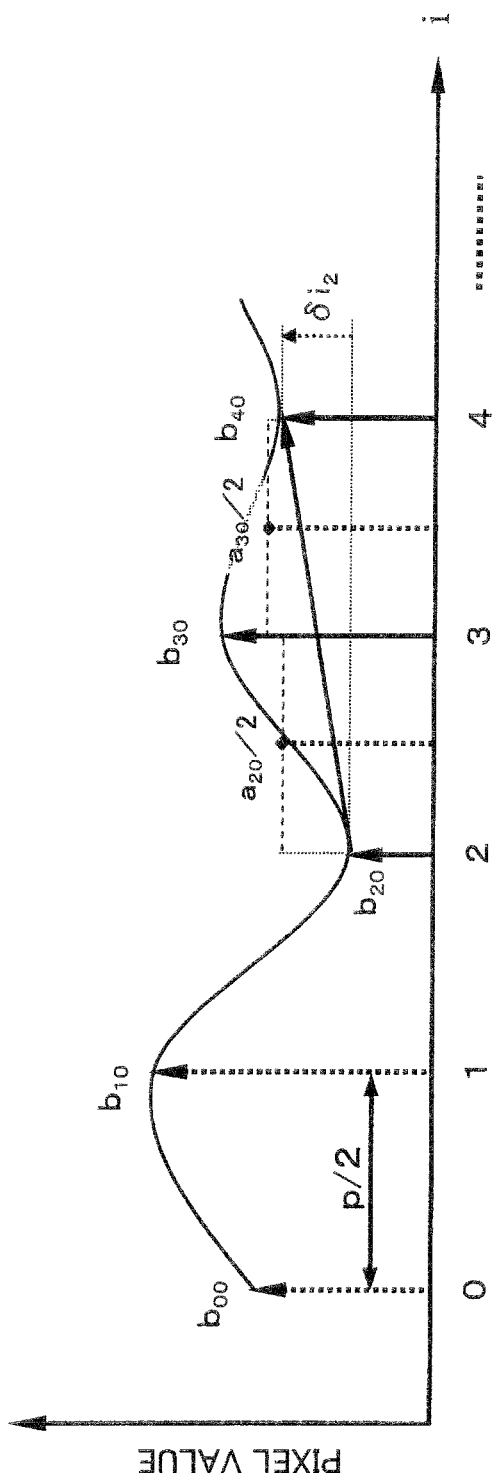
FIG. 14 is a view illustrating a second estimation method.

As illustrated in FIG. 14, the light-receiving value pattern $\{a_{20}, a_{30}\}$ is compared with the intermediate pixel value pattern $\phi_2$ $\{b_{20}, b_{30}, b_{40}\}$.

Figure 15:
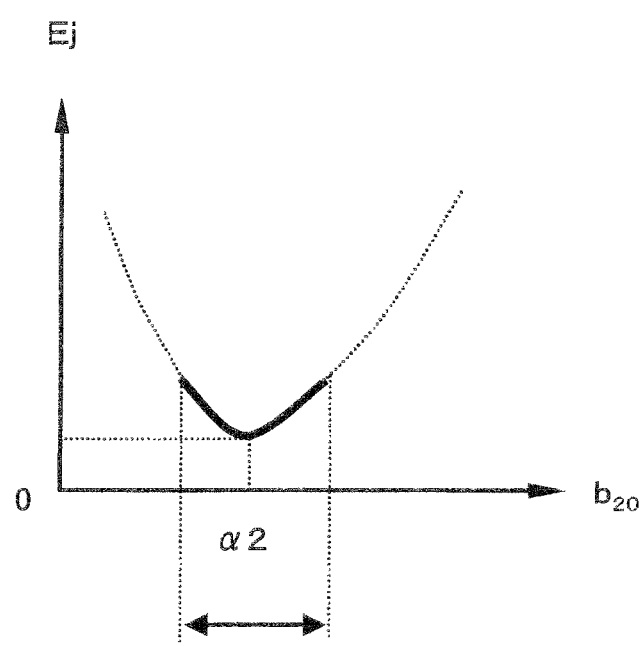
FIG. 15 is a view illustrating a search range setting method according to a second estimation method.

More specifically, the error evaluation function Ej is expressed as a function of the unknown ($b_{20}$) (see the following expression (17)). As illustrated in FIG. 15, a range around the intermediate pixel value $b_{20}$ ($=\alpha 1+\delta i_0$) is set as a search range by utilizing the fact that the intermediate pixel value $b_{20}$ has been calculated by estimating the intermediate pixel values $b_{00}$ to $b_{20}$. The unknown ($b_{20}$) is changed within the search range to determine the intermediate pixel value $\alpha 2$ ($=b_{00}$) at which the value of the evaluation function Ej becomes a minimum. This makes it possible to significantly reduce the number of calculations shown by the following expression (17), and increase the speed of the estimation process.

$$e_{ij} = \left(\frac{a_{ij}}{2}-b_{ij}\right)^2 + \left(\frac{a_{ij}}{2}-b_{(i+1)j}\right)^2, \quad (17)$$

$$Ej = \sum_{i=2}^{3} e_{ij}$$

Figure 16:
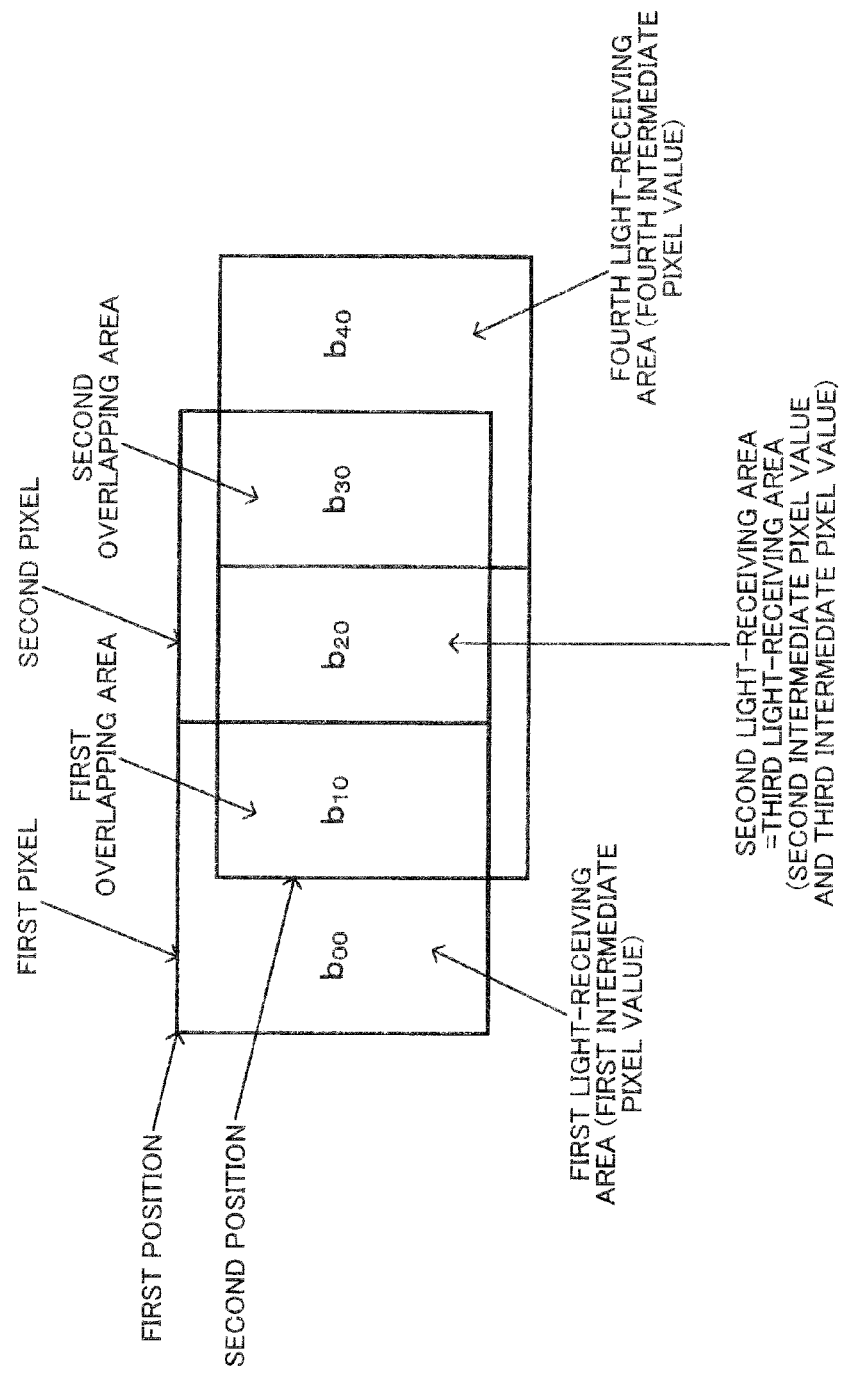
FIG. 16 is a view illustrating an outline of a second estimation method.

As illustrated in FIG. 16, a first pixel (first light-receiving unit) and a second pixel (second light-receiving unit) are adjacent to each other. The first pixel and the second pixel are sequentially set at a first position and a second position subsequent to the first position. The first pixel set at the first position and the first pixel set at the second position overlap each other in a first overlapping area, and the second pixel set at the first position and the second pixel set at the second position overlap each other in a second overlapping area.

An area obtained by removing the first overlapping area from the first pixel set at the first position is a first light-receiving area. An area obtained by removing the first overlapping area from the first pixel set at the second position is a second light-receiving area. A first intermediate pixel value and a second intermediate pixel value (e.g., $b_{00}$ and $b_{20}$) (i.e., the light-receiving value of the first light-receiving area and the light-receiving value of the second light-receiving area) are estimated ($b_{00}=\alpha 1$, $b_{20}=\alpha 1+\delta i_0$).

An area obtained by removing the second overlapping area from the second pixel set at the first position is a third light-receiving area. An area obtained by removing the second overlapping area from the second pixel set at the second position is a fourth light-receiving area. A third intermediate pixel value ($b_{20}$) (i.e., the light-receiving value of the third light-receiving area) is an unknown, and a fourth intermediate pixel value ($b_{40}$) (i.e., the light-receiving value of the fourth light-receiving area) is expressed by the relational expression ($b_{40}=b_{20}+\delta i_2$) using the unknown ($b_{20}$).

The third light-receiving area is identical with the second light-receiving area. The search range of the unknown ($b_{20}$) (i.e., third intermediate pixel value) is set based on the second intermediate pixel value ($b_{20}=\alpha 1+\delta i_0$) that has been calculated as the intermediate pixel value of the second light-receiving area. The unknown ($b_{20}$) is calculated within the search range by a search process to estimate the third intermediate pixel value ($b_{20}=\alpha 2$).

This makes it possible to quickly estimate the intermediate pixel value. Specifically, the search range of the unknown ($b_{20}$) that is estimated in the next estimation block can be set based on the second intermediate pixel value ($b_{20}=\alpha 1+\delta i_0$) that has been calculated. This makes it possible to limit the search range of the unknown ($b_{20}$), and reduce the number of searches.

5. Third Estimation Method

Although an example in which an unknown (e.g., $b_{00}$ or $b_{20}$) is estimated only once has been described above, an unknown may be estimated a plurality of times, and determined with high accuracy based on the estimated values. A third estimation method that determines an unknown from a plurality of estimated values is described below with reference to FIG. 17. The following description illustrates an example in which the intermediate pixel value ($b_{20}$) is estimated. Note that the estimated pixel value (e.g., $v_{02}$) can also be estimated by the following method.

Figure 17:
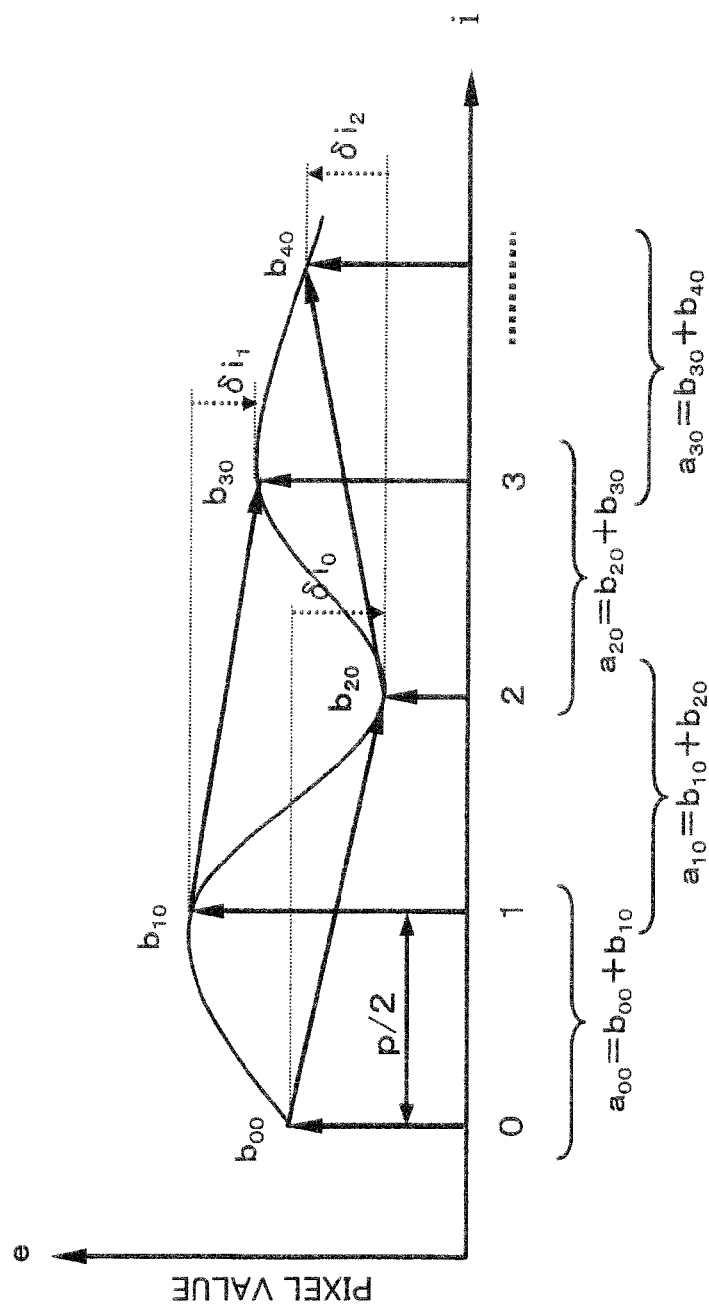
FIG. 17 is a view illustrating a third estimation method.

As illustrated in FIG. 17, the high-resolution intermediate pixel values $\phi_0$ {$b_{00}$, $b_{10}$, $b_{20}$} are calculated from the light-receiving values {$a_{00}$, $a_{10}$} in the horizontal direction detected by overlap shift sampling. The intermediate pixel values $\phi_0$ {$b_{00}$, $b_{10}$), $b_{20}$} are calculated by a method similar to the method using the expressions (10) to (13).

The high-resolution intermediate pixel values $\phi_1$ {$b_{10}$, $b_{20}$, $b_{30}$} are calculated from the light-receiving values {$a_{10}$, $a_{20}$} by a method similar to the method using the expressions (14) to (17). The high-resolution intermediate pixel values $\phi_2$ {$b_{20}$, $b_{30}$, $b_{40}$} are calculated from the light-receiving values {$a_{20}$, $a_{30}$)} by a method similar to the method using the expressions (14) to (17).

The intermediate pixel value $b_{20}$ is included in the sets $\phi_0$, $\phi_1$, and $\phi_2$. Therefore, three estimated values of the intermediate pixel value $b_{20}$ are obtained by the three estimation calculations. The final intermediate pixel value $b_{20}$ is determined from the three estimated values. For example, the final intermediate pixel value $b_{20}$ may be determined by any of the following first to fourth determination methods.

The first determination method determines the average value of the three estimated values to be the final intermediate pixel value $b_{20}$.

The second determination method specifies two values among the three estimated values between which the difference is the smallest, and determines the average value of the two estimated values to be the final intermediate pixel value $b_{20}$. This method can improve the unknown estimation accuracy by utilizing two close estimated values as probable estimated values.

The third determination method adds up the pixel values of a number of known high-resolution image samples to calculate the light-receiving values and the intermediate pixel values. An intermediate pixel value pattern having high occurrence probability with respect to the light-receiving value pattern is specified in advance from the light-receiving values and the intermediate pixel values. An intermediate pixel value pattern having high occurrence probability with respect to the light-receiving value pattern acquired by shooting is determined referring to the relationship specified in advance. One of the intermediate pixel value patterns $\phi_0$, $\phi_1$, and $\phi_2$ that is closest to the calculated intermediate pixel value pattern is determined, and the intermediate pixel value $b_{20}$ included in the determined intermediate pixel value pattern is determined to be the final intermediate pixel value $b_{20}$ as the most probable value. This method can estimate the pixel value while reflecting a known image (e.g., natural image).

The fourth determination method determines the final intermediate pixel value $b_{20}$ based on the degree of change in the differences $\delta i_0$, $\delta i_1$, and $\delta i_2$ between the pixel values $a_{00}$ and $a_{30}$ used to derive the three estimated values. A degree-of-change combination pattern $\xi$ {$\delta i_0$, $\delta i_1$, $\delta i_2$} is used to determine the final intermediate pixel value $b_{20}$. The pixel values of a number of known high-resolution image samples are added up to calculate the element patterns $\phi_0$, $\phi_1$, and $\phi_2$ and the combination pattern $\xi$. The occurrence probability distribution of the intermediate pixel value $b_{20}$ with respect to the combination pattern $\xi$ is calculated in advance from the element patterns and the combination pattern $\xi$. The occurrence probability distribution of the intermediate pixel value $b_{20}$ with respect to the difference pattern $\xi$ calculated from the shot image is calculated referring to the occurrence probability distribution calculated in advance. One of the three estimated values (obtained by the estimation calculations) that has the highest occurrence probability is determined using the occurrence probability distribution to specify the final intermediate pixel value $b_{20}$. Specifically, since the occurrence probability of the intermediate pixel value $b_{20}$ with respect to the degree-of-change combination pattern $\xi$ is known in advance, the most probable intermediate pixel value $b_{20}$ can be determined from the three estimated values using the combination pattern $\xi$. This method can estimate the pixel value while reflecting a known image (e.g., natural image). Moreover, the pixel value can be estimated corresponding to the degree of change in the pixel value independently of the pixel value itself.

Figure 18:
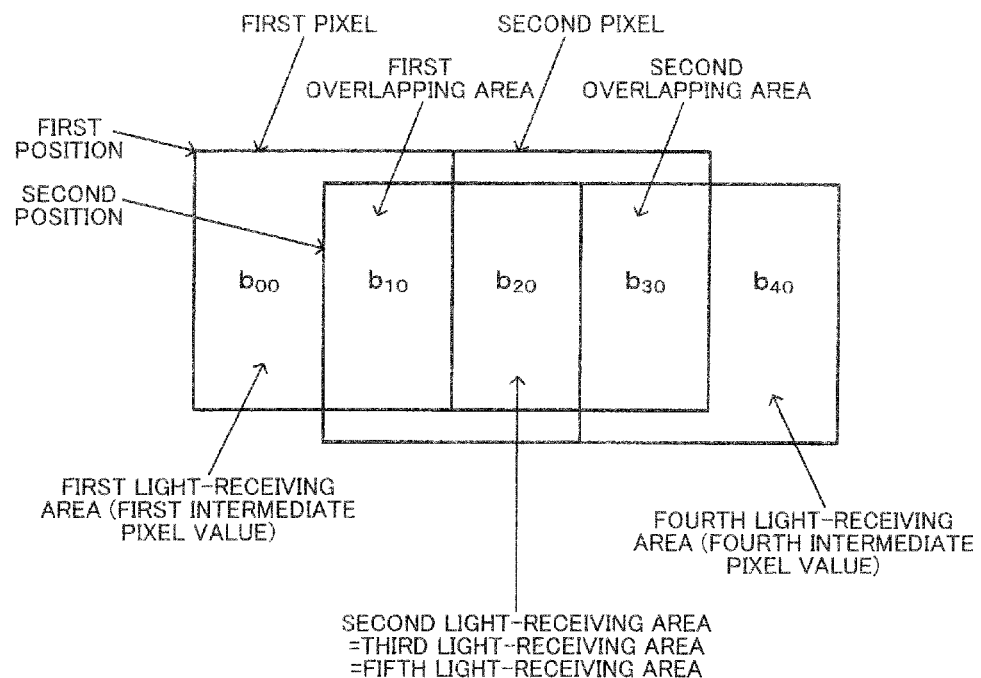
FIG. 18 is a view illustrating an outline of a third estimation method.

As illustrated in FIG. 18, a first pixel (first light-receiving unit) and a second pixel (second light-receiving unit) are adjacent to each other. The first pixel and the second pixel are sequentially set at a first position and a second position subsequent to the first position. The first pixel set at the first position and the first pixel set at the second position overlap each other in a first overlapping area, and the second pixel set at the first position and the second pixel set at the second position overlap each other in a second overlapping area.

An area obtained by removing the first overlapping area from the first pixel set at the first position is a first light-receiving area. An area obtained by removing the first overlapping area from the first pixel set at the second position is a second light-receiving area. A first intermediate pixel value pattern ($\phi_0=\{b_{00}, b_{10}, b_{20}\}$) that includes consecutive intermediate pixel values that include a first intermediate pixel value and a second intermediate pixel value (e.g., $b_{00}$ and $b_{20}$) (i.e., the light-receiving value of the first light-receiving area and the light-receiving value of the second light-receiving area) is estimated.

An area obtained by removing the second overlapping area from the second pixel set at the first position is a third light-receiving area. An area obtained by removing the second overlapping area from the second pixel set at the second position is a fourth light-receiving area. A second intermediate pixel value pattern ($\phi_2=\{b_{20}, b_{30}, b_{40}\}$) that includes consecutive intermediate pixel values that include a third intermediate pixel value and a fourth intermediate pixel value (e.g., $b_{20}$ and $b_{40}$) (i.e., the light-receiving value of the third light-receiving area and the light-receiving value of the fourth light-receiving area) is estimated.

The overlapping area of the first pixel set at the second position and the second pixel set at the first position is a fifth light-receiving area. A third intermediate pixel value pattern ($\phi_1=\{b_{10}, b_{20}, b_{30}\}$) that includes consecutive intermediate pixel values that include a fifth intermediate pixel value ($b_{20}$) (i.e., the light-receiving value of the fifth light-receiving area), and do not include the first intermediate pixel value and the fourth intermediate pixel value ($b_{00}$ and $b_{40}$) is estimated.

The third light-receiving area and the fifth light-receiving area are identical with the second light-receiving area. The intermediate pixel value ($b_{20}$) of the above identical light-receiving area is determined based on the second intermediate pixel value, the third intermediate pixel value, and the fifth intermediate pixel value ($b_{20}$) obtained by estimating the first intermediate pixel value pattern ($\phi_0$), the second intermediate pixel value pattern ($\phi_2$), and the third intermediate pixel value pattern ($\phi_1$).

This makes it possible to estimate the pixel value with high accuracy. Specifically, the final pixel value can be determined based on three (a plurality of) estimated values obtained by performing three (a plurality of) estimation calculations. For example, a pixel value estimation process that is in conformity with the pixel value pattern of the actual image can be implemented by utilizing the determination method using a known image.

6. Fourth Estimation Method

Figure 19:
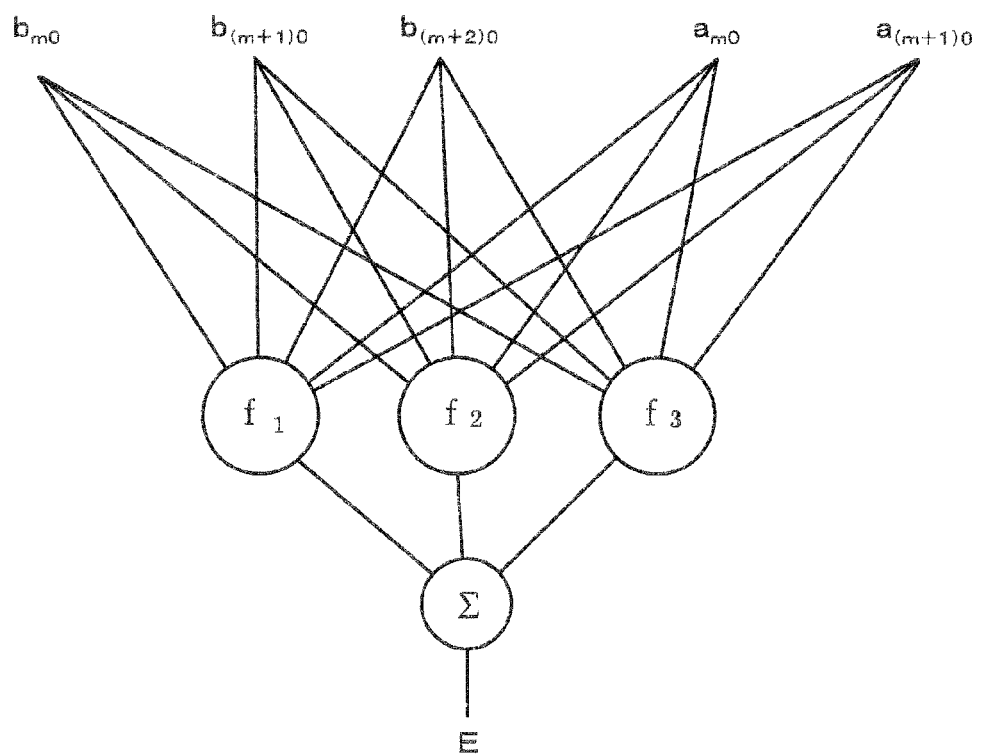
FIG. 19 is a view illustrating a fourth estimation method.

Although an example in which the pixel value is estimated using the least-square method has been described above, the pixel value may be estimated using a neural network (nonlinear estimation method). A fourth estimation method that utilizes a neural network is described below with reference to FIG. 19. The following description illustrates an example in which the intermediate pixel value (e.g., $b_{00}$) is estimated. Note that the estimated pixel value (e.g., $v_{00}$) can also be estimated by the following method.

In the fourth estimation method, the pixel values of a known high-resolution image are added up to calculate the light-receiving values $\{a_{m0}, a_{(m+1)0}\}$ and the intermediate pixel value pattern $\phi_m$ $\{b_{m0}, b_{(m+1)0}, b_{(m+2)0}\}$ corresponding to the light-receiving values (m is an integer equal to or larger than 0). A weighting coefficient W is calculated in advance by neural network learning computation (see FIG. 19) using the above values as learning data. More specifically, the weighting coefficient W is calculated so that an error evaluation value E shown by the following expression (18) is zero (may be approximately zero (given value in a broad sense)). A common neural network learning method may be used.

The intermediate pixel value is estimated from the shot image using the weighting coefficient W calculated in advance. More specifically, a relational expression of the intermediate pixel values is obtained by the method described using the expression (2), for example, and an intermediate pixel value $b_{m0}$ ($=\alpha$) at which the error evaluation value E (see the expression (18)) becomes a minimum is calculated while changing the unknown ($b_{m0}$).

$$\begin{pmatrix} f_1 \\ f_2 \\ f_3 \end{pmatrix} = \begin{pmatrix} W_{11} & W_{12} & W_{13} & W_{14} & W_{15} \\ W_{21} & W_{22} & W_{23} & W_{24} & W_{25} \\ W_{31} & W_{32} & W_{33} & W_{34} & W_{35} \end{pmatrix} \begin{pmatrix} b_{m0} \\ b_{(m+1)0} \\ b_{(m+2)0} \\ a_{m0} \\ a_{(m+1)0} \end{pmatrix}, \quad (18)$$

$$E = W_{41}f_1 + W_{42}f_2 + W_{43}f_3$$

According to the fourth estimation method, the relationship between the light-receiving values $\{a_{m0}, a_{(m+1)0}\}$ of the pixel and the intermediate pixel value pattern $\phi_m$ $\{b_{m0}, b_{(m+1)0}, b_{(m+2)0}\}$ is acquired based on a known high-resolution frame image as prior information that specifies the similarity between the light-receiving values of the pixel and the intermediate pixel value pattern in advance. The similarity between the intermediate pixel value pattern $\phi_m$ $\{b_{m0}, b_{(m+1)0}, b_{(m+2)0}\}$ (expressed by the relational expression of the intermediate pixel values) and the light-receiving values $\{a_{m0}, a_{(m+1)0}\}$ of the pixel is evaluated based on the acquired prior information.

According to this configuration, since the similarity is evaluated based on the prior information that is acquired based on a known high-resolution frame image, the pixel value can be estimated while reflecting image information (e.g., spatial frequency characteristics) included in the known image (e.g., natural image).

According to the fourth estimation method, the image processing device includes a neural network. The neural network utilizes the node weighting coefficient W obtained by learning based on a known high-resolution frame image as the prior information. The neural network receives the intermediate pixel value pattern $\phi_m=\{b_{m0}, b_{(m+1)0}, b_{(m+2)0}\}$ and the light-receiving values $\{a_{m0}, a_{(m+1)0}\}$ of the pixel, and outputs the similarity evaluation result E. Each intermediate pixel value of the intermediate pixel value pattern $\phi_m=\{b_{m0}, b_{(m+1)0}, b_{(m+2)0}\}$ are determined based on the similarity evaluation result E output from the neural network.

This makes it possible to evaluate the similarity between the intermediate pixel value pattern and the light-receiving values of the pixels based on the prior information using the neural network that utilizes the node weighting coefficient W obtained by learning.

According to the third estimation method, an intermediate pixel value pattern having high occurrence probability with respect to the light-receiving value pattern is calculated as the prior information (third determination method). Alternatively, the occurrence probability distribution of the intermediate pixel value $b_{20}$ with respect to the degree-of-change combination pattern $\xi$ $\{\delta i_0, \delta i_1, \delta i_2\}$ may be calculated as the prior information (fourth determination method).

This makes it possible to estimate the pixel value using the occurrence probability distribution of the pixel value as the prior information. Therefore, a pixel value with high occurrence probability in a known image (e.g., natural image) can be used as the estimated value.

7. Adaptive Noise Reduction Process

Figure 20:
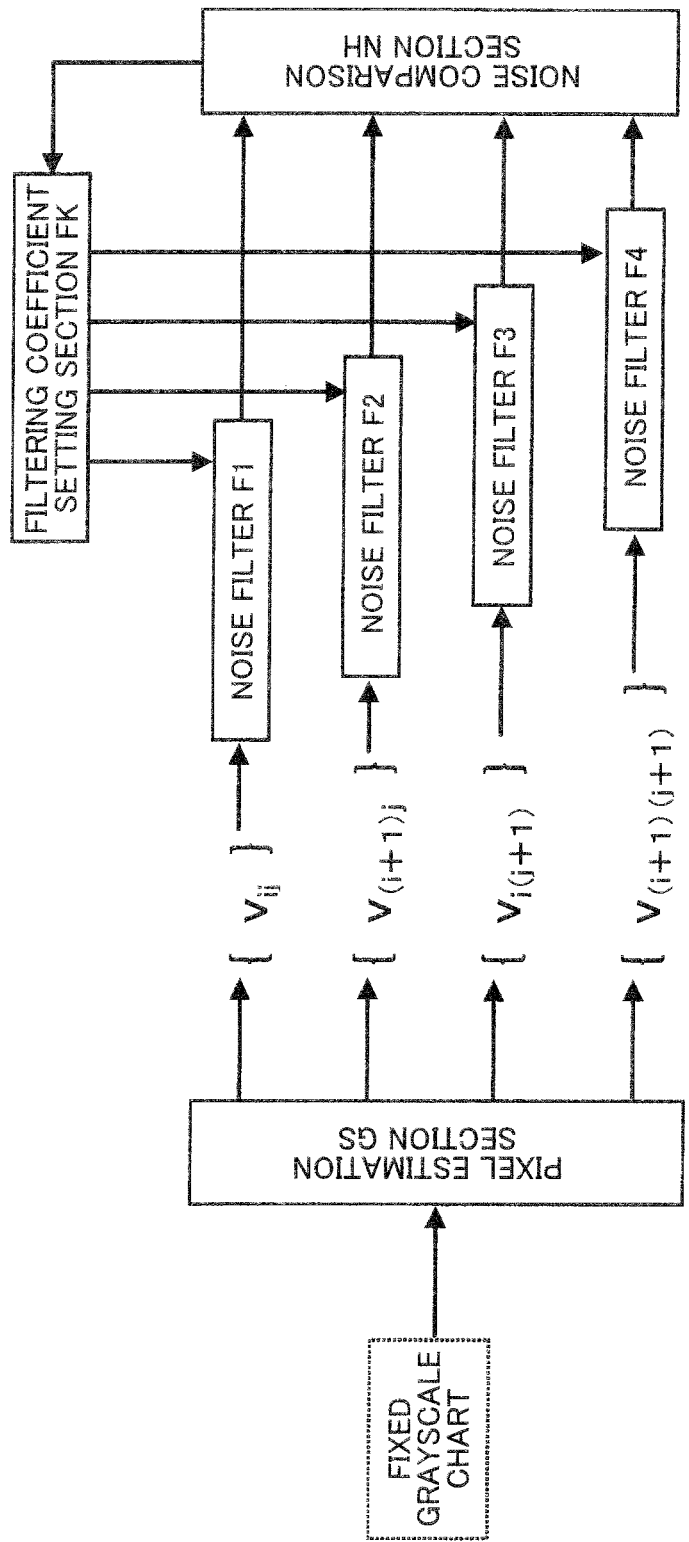
FIG. 20 illustrates a configuration example of a noise filter.

In one embodiment of the invention, a noise filtering process (filtering process in a broad sense) corresponding to the pixel position may be performed on the estimated pixel value $v_{ij}$. FIG. 20 illustrates a configuration example of a noise filter.

For example, when performing the pixel estimation process by overlap shift sampling, noise occurs in a different way depending on the positions of the final estimated pixels $v_{ij}$ to $v_{(i+1)(j+1)}$. As illustrated in FIG. 20, a solid image having a fixed grayscale (fixed grayscale chart) is shot, and the estimation process is performed on the shot image. The final estimated pixels $v_{ij}$ to $v_{(i+1)(j+1)}$ that differ in position are compared using a noise comparison section NH. A filtering coefficient setting section FK sets a filtering coefficient based on the comparison results so as to increase the noise reduction effect of a noise filter (F1 to F4) corresponding to the pixel position at which a large amount of noise occurs. Specifically, the filtering coefficient is set so that noise occurs in an identical (almost identical) way independently of the positions of the final estimated pixels $v_{ij}$ to $v_{(i+1)(j+1)}$. The image quality of the estimated pixel image can be improved by performing the filtering process while setting the filtering coefficient as described above.

According to the above noise filtering process, the filtering process is performed on the estimated pixel values $v_{ij}$ to $v_{(i+1)(j+1)}$ using a different filtering coefficient depending on the position of the estimated pixel.

Therefore, even if noise occurs in a different way depending on the position of the estimated pixel, noise can be reduced by performing the noise filtering process corresponding to the position of the estimated pixel.

8. First Interpolation Method

Figure 21:
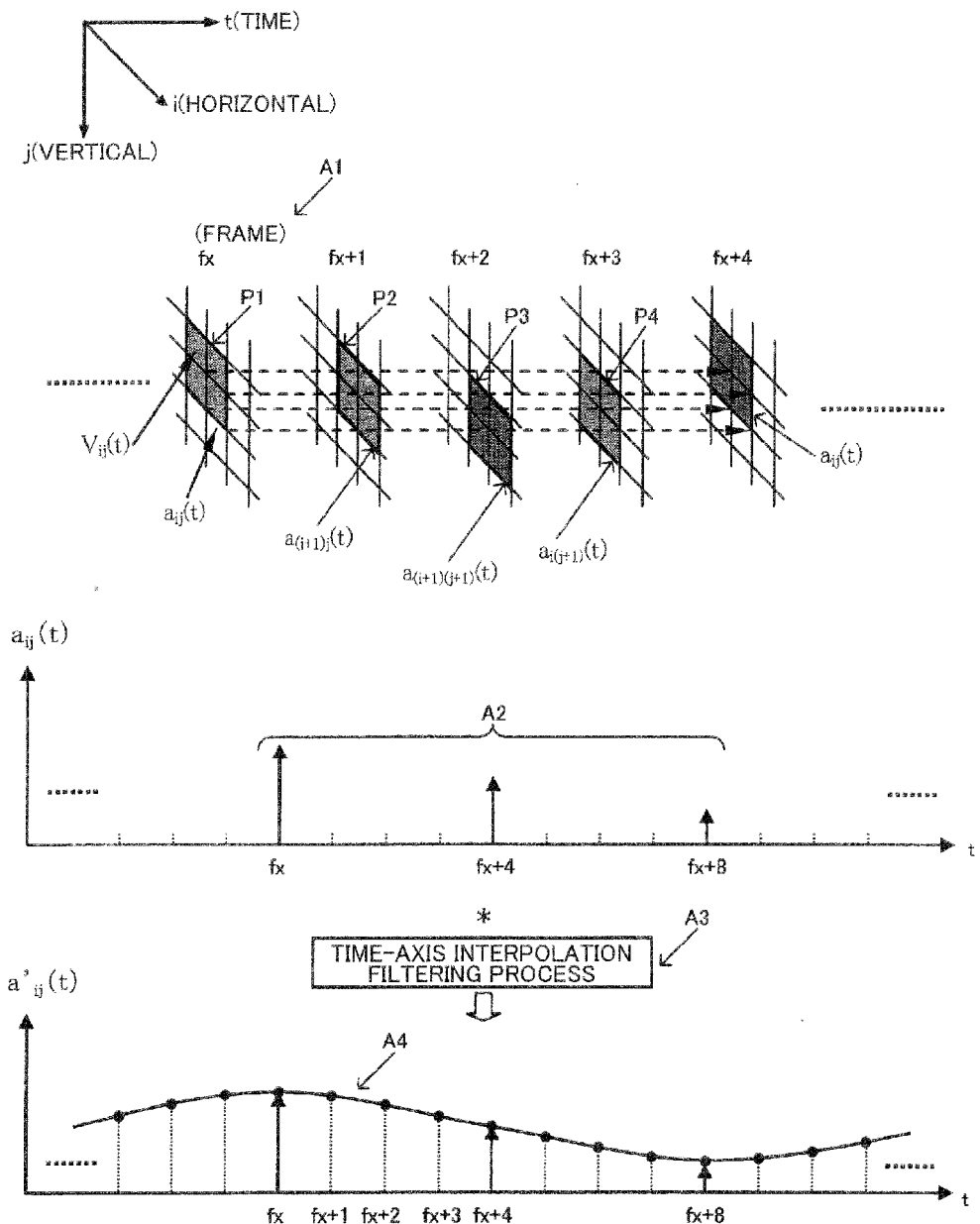
FIG. 21 is a view illustrating a first light-receiving value interpolation method.

In one embodiment of the invention, the light-receiving value obtained by overlap sampling may be used directly as the light-receiving value (e.g., $a_{00}$) used to estimate the pixel values, or a light-receiving value generated by an interpolation process may be used as the light-receiving value (e.g., $a_{00}$) used to estimate the pixel values. A light-receiving value interpolation method according to one embodiment of the invention is described below with reference to FIGS. 21 and 22. FIG. 21 is a view illustrating a first interpolation method.

Note that the term "frame" used herein refers to a timing at which one low-resolution frame image is captured by an image sensor, or a timing at which one low-resolution frame image is processed by image processing, for example. A low-resolution frame image or a high-resolution frame image included in image data may also be appropriately referred to as "frame".

The first interpolation method interpolates the light-receiving value in the interpolation target frame using the light-receiving value acquired in another frame (time-axis interpolation process).

More specifically, the light-receiving values $a_{ij}$, $a_{(i+1)j}$, $a_{(i+1)(j+1)}$, and $a_{i(j+1)}$ are sequentially acquired in frames fx to fx+3 (see A1 in FIG. 21). The light-receiving value $a_{ij}$ is acquired again in a frame a+4. Specifically, a low-resolution frame image having the light-receiving value $a_{ij}$ is acquired in the frames fx, fx+4, and fx+8 (i.e., every four frames) (see A2). A time-axis interpolation filtering process (filtering process) is performed on the time-series data of the light-receiving value $a_{ij}$ (see A3). A light-receiving value $a'_{ij}$ is generated in each frame by performing the time-axis interpolation filtering process (see A4).

Each light-receiving value is acquired every four frames, and subjected to the time-axis interpolation filtering process to generate the light-receiving values $a'_{ij}$, $a'_{(i+1)j}$, $a'_{(i+1)(j+1)}$, and $a'_{i(j+1)}$ in each frame.

Figure 22:
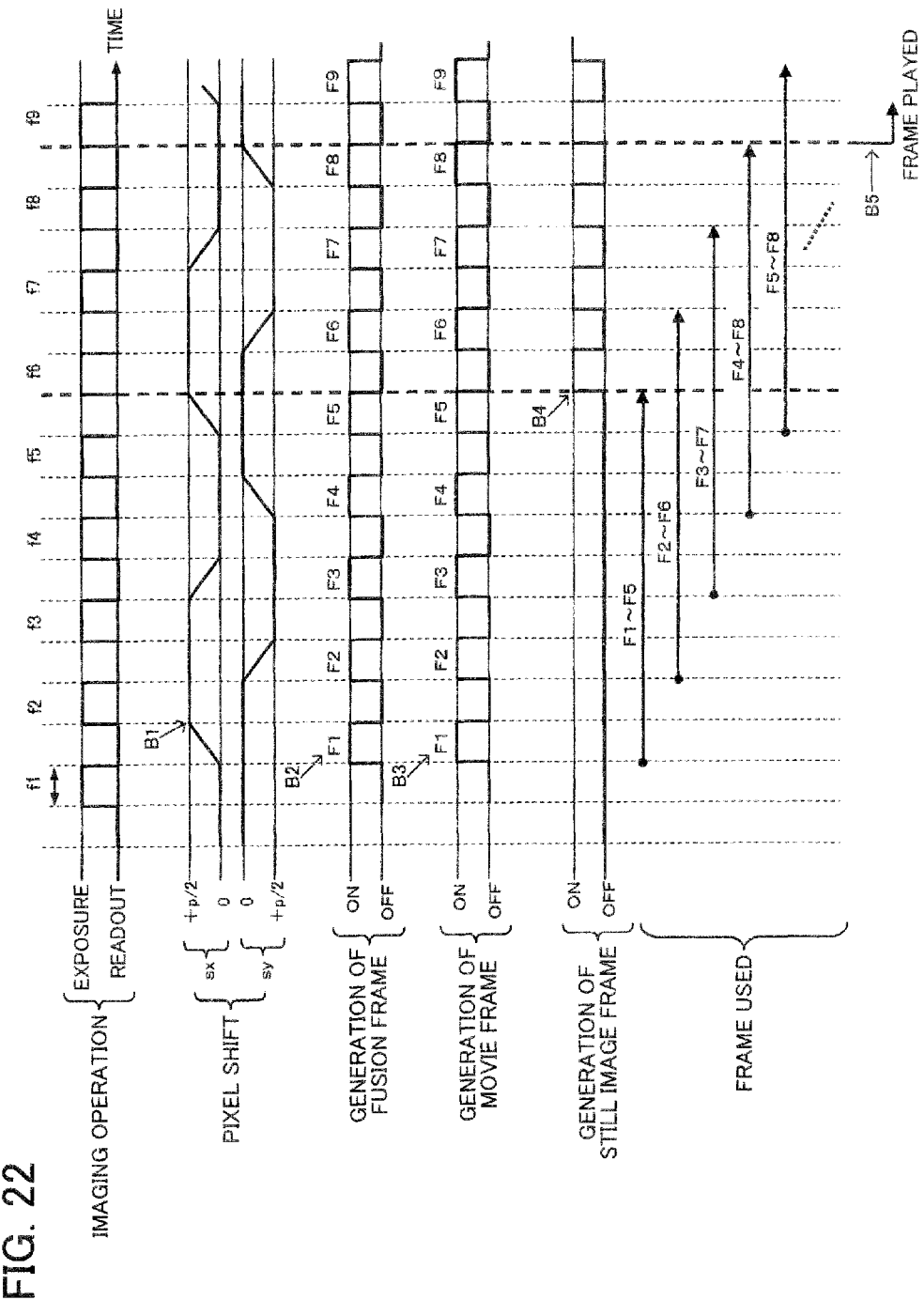
FIG. 22 illustrates an example of a timing chart of an interpolation process.

FIG. 22 illustrates an example of a timing chart of the interpolation process. As indicated by B1 in FIG. 22, the position of the pixel is shifted by a half pixel in each frame. As indicated by B2, fusion frames F1, F2, . . . (low-resolution frame images) are shot every frame. As indicated by B3, low-resolution movie frames are generated, and displayed as a live view, or recorded. As indicated by B4, the time-axis interpolation process is performed on the light-receiving value, and the pixel values are estimated using the light-receiving value obtained by the interpolation process to generate a high-resolution still image frame. As indicated by B5, a high-resolution still image or a high-resolution movie is output in the ninth frame (i.e., a frame after each light-receiving value has been subjected to the interpolation process).

Since the low-resolution frame images are sequentially acquired while shifting each pixel, four frames are required to acquire the light-receiving values used to estimate the pixel values. Therefore, when the acquired light-receiving values are used directly to estimate the pixel values, the image quality may deteriorate when the object makes a motion since the light-receiving values in different frames are used to estimate the pixel values.

According to one embodiment of the invention, the pixel is shifted every frame (fx, fx+1, . . . ), and is sequentially set at a plurality of positions (four positions (P1 to P4 in FIG. 21)). The pixel is set at an identical position every multiple frames (every four frames). The light-receiving values $a_{ij}$ to $a_{(i+1)(j+1)}$ corresponding to the respective positions are thus acquired in time series, and low-resolution frame images are acquired in time series based on the acquired light-receiving values (i.e., consecutive low-resolution frame images).

A process that interpolates the light-receiving values $a'_{ij}$ to $a'_{(i+1)(j+1)}$ of the pixel at the positions P1 to P4 is performed on the acquired consecutive low-resolution frame images. More specifically, the light-receiving value ($a'_{ij}$) of the pixel at the missing position (e.g., P1) in the consecutive low-resolution frame image in the interpolation target frame (e.g., fx+1) is interpolated by the time-axis interpolation process. That is, the light-receiving value ($a'_{ij}$) is interpolated by the time-axis interpolation process using the light-receiving values ($a_{ij}$) of the pixel in the consecutive low-resolution frame images in the frames (fx and fx+4) that respectively precede or follow the interpolation target frame (fx+1).

The pixel value $v_{ij}$ of the pixel in each frame (fx, fx+1, . . . ) is estimated based on the consecutive low-resolution frame images subjected to the time-axis interpolation process.

This makes it possible to acquire the light-receiving values while shifting the pixel, interpolate the light-receiving value at the missing position using the acquired light-receiving values, and calculate the final estimated pixel values from the light-receiving value obtained by the interpolation process. Therefore, since the light-receiving value at each position can be interpolated in each frame, the pixel values can be estimated from the light-receiving values in the same frame, and a deterioration in image quality can be prevented even when the object makes a motion.

According to one embodiment of the invention, the time-axis interpolation process is performed using the time-axis interpolation filtering process.

This makes it possible to interpolate the light-receiving values ($a_{ij}$ in the frames fx and fx+4) at each position (e.g., P1) using the time-axis interpolation process, and generate the light-receiving values ($a'_{ij}$) at the missing position (P1 in the frames fx+1 to fx+3).

9. Second Interpolation Method

In one embodiment of the invention, an adaptive light-receiving value interpolation process may be performed corresponding to the motion of the object. A second interpolation method that implements an adaptive light-receiving value interpolation process is described below with reference to FIGS. 23 and 24.

The second interpolation method applies the light-receiving value in the preceding or subsequent frame to the light-receiving value for which the amount of motion is zero or small, and interpolates (estimates) the light-receiving value from the adjacent light-receiving values in the same frame when the amount of motion is large. Since it is determined that a motion has occurred in each pixel when panning or the like has been performed, a motion compensation process may be performed in advance.

Figure 23:
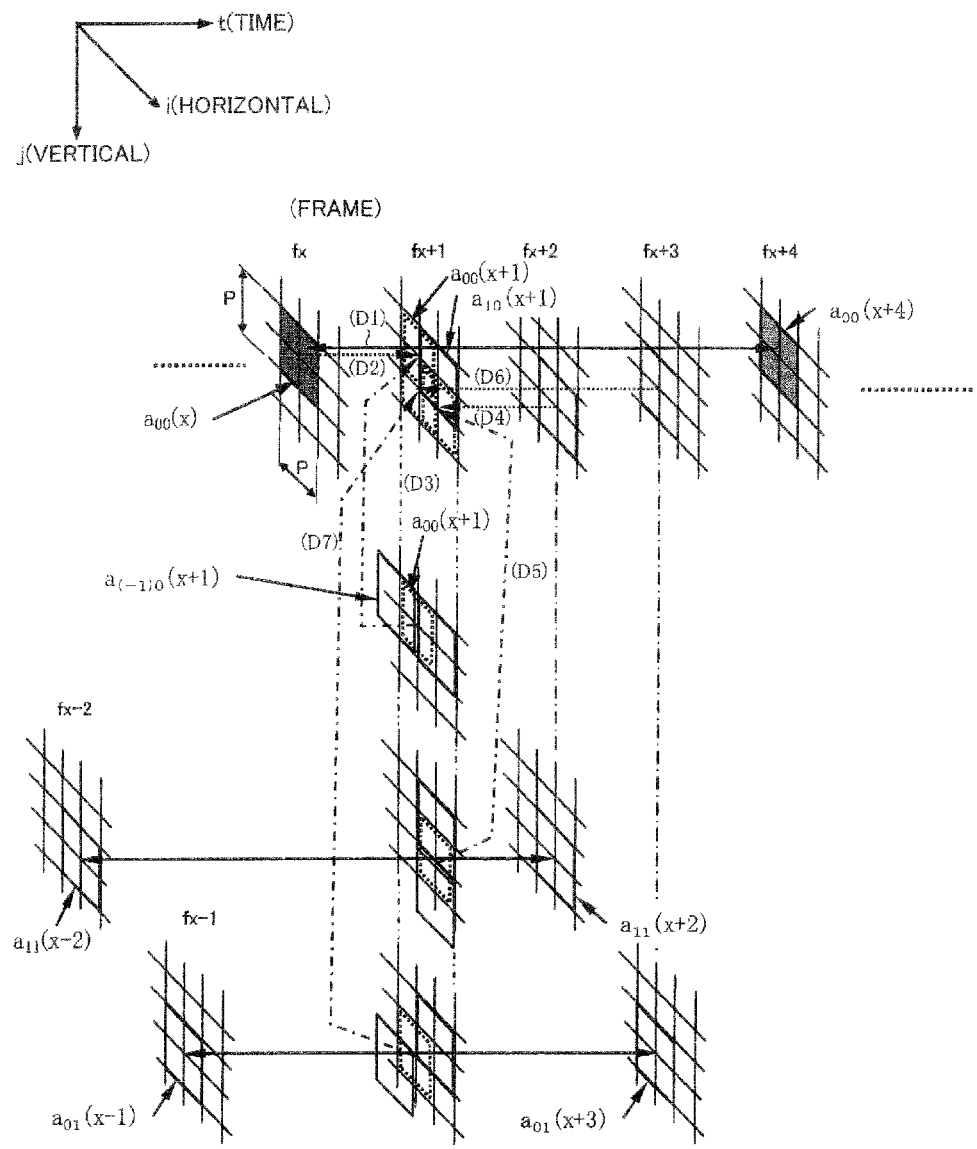
FIG. 23 is a view illustrating a second light-receiving value interpolation method.
Figure 24:
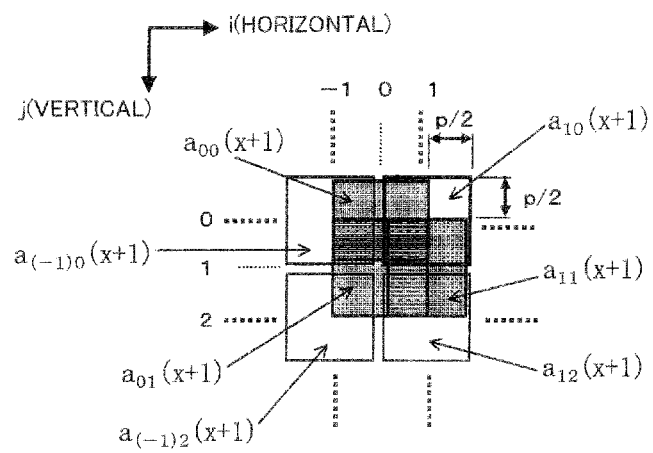
FIG. 24 is a view illustrating a second light-receiving value interpolation method.

The following description illustrates an example of generating a high-resolution still image in the low-resolution image frame fx+1 among the low-resolution image frames fx to fx+4 illustrated in FIG. 23. FIG. 24 illustrates some of the light-receiving values acquired as image data in the frame fx+1 for convenience of explanation. In FIG. 24, the acquired light-receiving values are indicated by $a_{10}(x+1)$, $a_{(-1)0}(x+1)$, $a_{(-1)2}(x+1)$, and $a_{12}(x+1)$.

As illustrated in FIG. 24, when calculating four high-resolution pixel values that correspond to the light-receiving value $a_{10}(x+1)$, it is necessary to calculate three light-receiving values $a_{00}(x+1)$, $a_{01}(x+1)$, and $a_{11}(x+1)$ that are shifted with respect to the light-receiving value $a_{10}(x+1)$ by a pixel pitch of p/2 using the interpolation process. These three light-receiving values are calculated as described below.

As indicated by D1 in FIG. 23, the light-receiving values $a_{00}(x)$ and $a_{00}(x+4)$ in the frames fx and fx+4 acquired at a position corresponding to the light-receiving value $a_{00}(x+1)$ are compared. When the difference between the light-receiving values $a_{00}(x)$ and $a_{00}(x+4)$ is smaller than a given threshold value δ, it is determined that the object (part of the object that makes a motion) has not passed through the pixel position corresponding to the light-receiving value $a_{00}(x+1)$ between the frames fx and fx+4. In this case, the light-receiving value $a_{00}(x)$ or $a_{00}(x+4)$ is used as the light-receiving value $a_{00}(x+1)$ (see D2).

When the difference between the light-receiving values $a_{00}(x)$ and $a_{00}(x+4)$ is larger than the threshold value δ, it is determined that the object has passed through the pixel position corresponding to the light-receiving value $a_{00}(x+1)$ between the frames fx and fx+4. In this case, an interpolated value is calculated using the light-receiving values $a_{10}(x+1)$ and $a_{(-1)0}(x+1)$ adjacent to the light-receiving value $a_{00}(x+1)$ in the same frame, and used as the light-receiving value $a_{00}(x+1)$. For example, the average value of the light-receiving values $a_{10}(x+1)$ and $a_{(-1)0}(x+1)$ is used as the light-receiving value $a_{00}(x+1)$. Note that the light-receiving value may be interpolated using three or more peripheral light-receiving values instead of using the average value of two adjacent light-receiving values.

The interpolation method for the light-receiving value $a_{00}(x+1)$ is shown by the following expression (19).

When $|a_{00}(x)-a_{00}(x+4)| \leq \delta$, $$a_{00}(x+1)=a_{00}(x)=a_{00}(x+4)$$

When $|a_{00}(x)-a_{00}(x+4)|>\delta$, $$a_{00}(x+1)=\{a_{10}(x+1)+a_{(-1)0}(x+1)\}/2 \tag{19}$$

Likewise, the light-receiving value $a_{11}(x+1)$ is interpolated as shown by the following expression (20) (see D4 and D5).

When $|a_{11}(x-2)-a_{11}(x+2)| \leq \delta$, $$a_{11}(x+1)=a_{11}(x-2)=a_{11}(x+2)$$

When $|a_{11}(x-2)-a_{11}(x+2)|>\delta$, $$a_{11}(x+1)=\{a_{10}(x+1)+a_{12}(x+1)\}/2 \tag{20}$$

The light-receiving value $a_{01}(x+1)$ is interpolated as shown by the following expression (21) (see D6 and D7).

When $|a_{01}(x-1)-a_{01}(x+3)| \leq \delta$, $$a_{01}(x+1)=a_{01}(x-1)=a_{01}(x+3)$$

When $|a_{01}(x-1)-a_{01}(x+3)|>\delta$, $$a_{01}(x+1)=\{a_{10}(x+1)+a_{(-1)2}(x+1)\}/2 \tag{21}$$

Note that the threshold value δ may be set to a value for appropriately evaluating the quality image. For example, the threshold value δ may be set so as to prevent a situation in which it is determined that a motion is present in a still image due to noise.

According to the second interpolation method, the difference $(a_{00}(x)-a_{00}(x+4))$ between the light-receiving values of the pixel in the frames (e.g., fx and fx+4) that respectively precede or follow the interpolation target frame (e.g., fx+1) is calculated. When the difference is smaller than the threshold value δ, the light-receiving value $(a_{00}(x+1))$ of the pixel at the missing position in the interpolation target frame (fx+1) is interpolated using the light-receiving value $(a_{00}(x)$ or $a_{00}(x+4))$ of the pixel at a position identical with the missing position in the frame (fx or fx+4) that precedes or follows the interpolation target frame. When the difference is larger than the threshold value δ, the light-receiving value $(a_{00}(x+1))$ of the pixel at the missing position in the interpolation target frame (fx+1) is interpolated using the light-receiving values $(a_{10}(x+1)$ and $a_{(-1)0}(x+1))$ acquired in the interpolation target frame (fx+1).

This makes it possible to adaptively interpolate the light-receiving value corresponding to the motion of the object. More specifically, since the light-receiving value acquired at an identical position is used for the pixel in which the motion of the object is small, a positional error can be reduced. Since the light-receiving value acquired in the same frame is used for the pixel in which the motion of the object is large, a temporal error can be reduced. For example, the time when the object has passed through an arbitrary pixel position between the frames fx and fx+4 cannot be determined from the light-receiving values $a_{00}(x)$ and $a_{00}(x+4)$. Therefore, if the light-receiving value $a_{00}(x+1)$ is interpolated using the light-receiving values $a_{00}(x)$ and $a_{00}(x+4)$, the effect of the motion of the object occurs even at a timing that precedes the timing at which the object has passed through the pixel position. According to the second interpolation method, since the light-receiving value is interpolated using the light-receiving values at the same frame when it has been determined that the object has passed through the pixel position, it is possible to accurately reflect the timing at which the object has passed through the pixel position.

According to the second interpolation method, it is possible to prevent a deterioration in image quality due to erroneous motion detection. For example, when a change in brightness that exceeds the threshold value δ has occurred during a period in which four frames are shot, the change in brightness may be erroneously detected as a motion of the object. According to the second interpolation method, since the interpolation method is merely changed to the intraframe interpolation method even when erroneous detection has occurred, a significant deterioration in image quality can be prevented.

Figure 25:
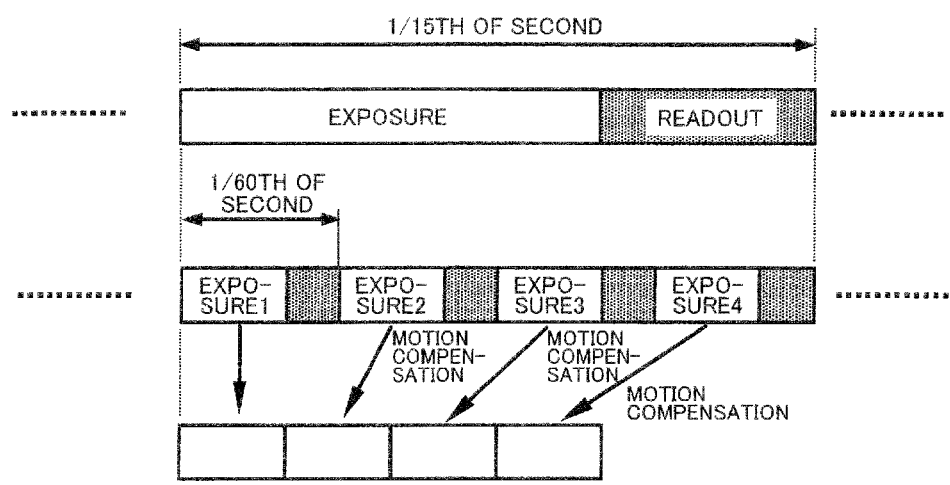
FIG. 25 is a view illustrating a motion compensation process performed on a fusion frame.

When using the first interpolation method or the second interpolation method, the light-receiving value may be interpolated using a motion compensation process. For example, a still image (i.e., a high-resolution image that is shot at a low frame rate (1/15th of a second)) may be generated by performing a motion compensation process on four consecutive fusion frames that have been shot at a high frame rate (1/60th of a second) (see FIG. 25).

10. Imaging Device and Image Processing Device

Figure 26:
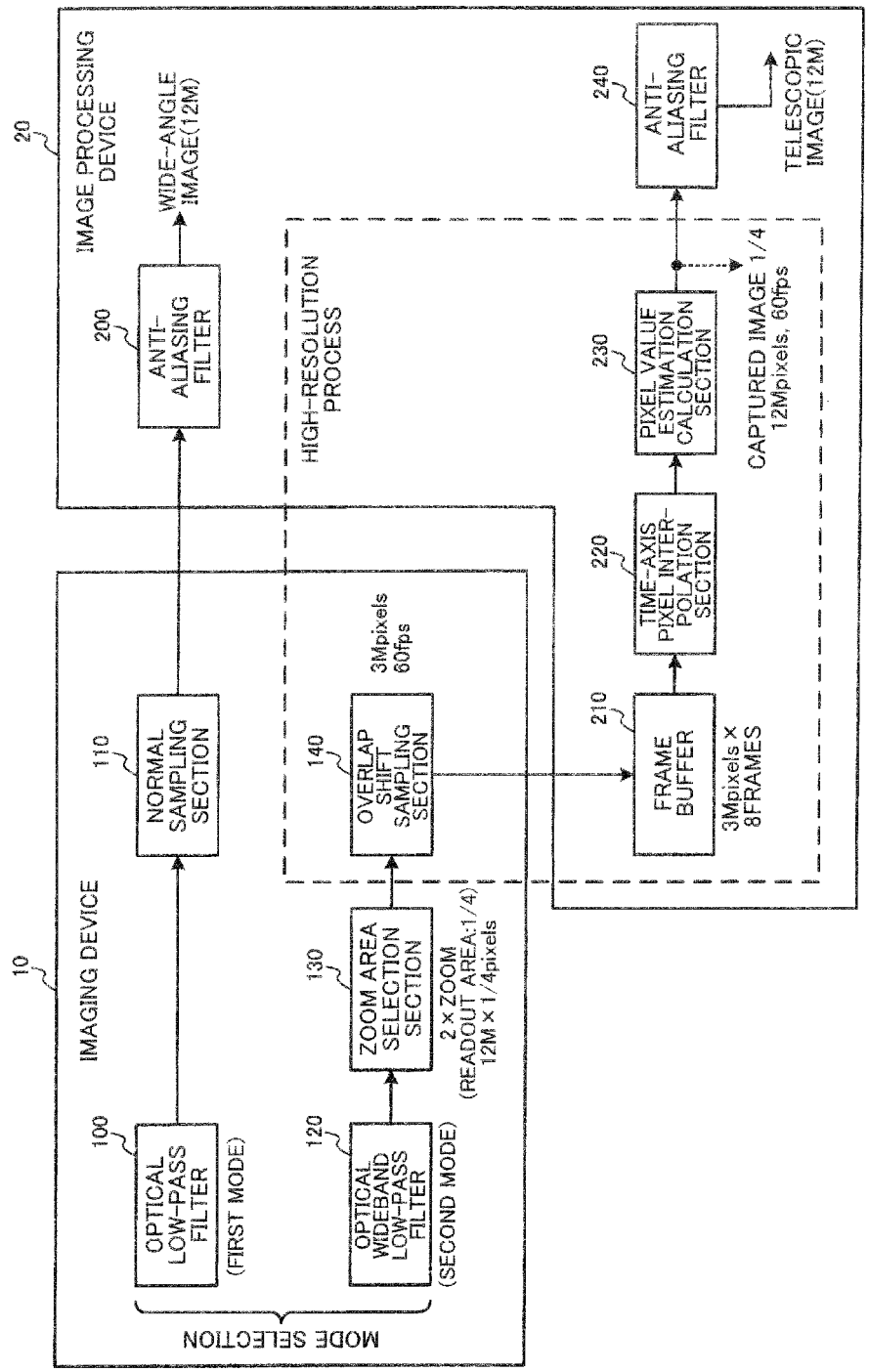
FIG. 26 illustrates a first detailed configuration example of an imaging device and an image processing device.
Figure 27:
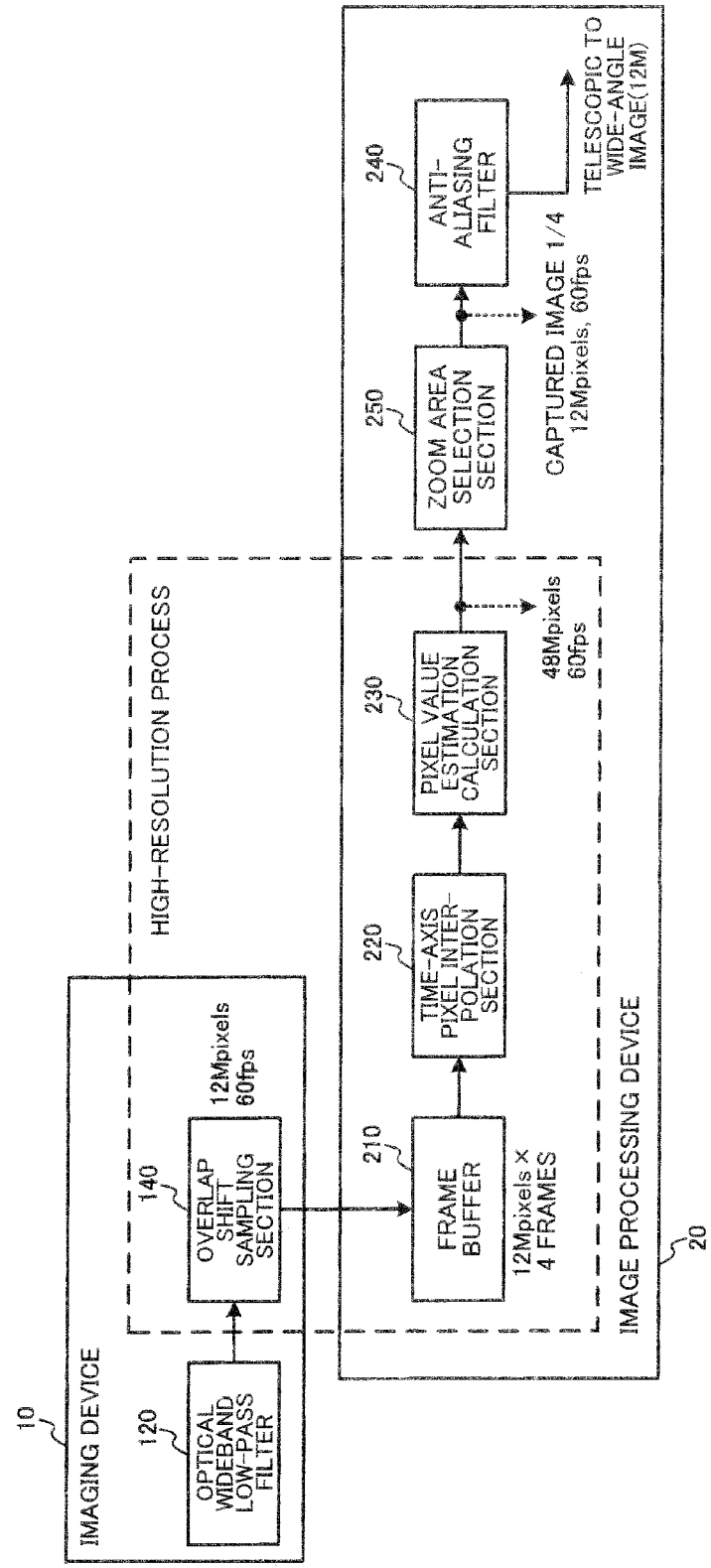
FIG. 27 illustrates a second detailed configuration example of an imaging device and an image processing device.

FIGS. 26 and 27 illustrate a detailed configuration example of an imaging device and an image processing device that perform the above estimation process and time-axis interpolation process.

FIG. 26 illustrates a first detailed configuration example of an imaging device and an image processing device that perform zoom selection before shifting each pixel. An imaging device 10 illustrated in FIG. 26 includes an optical low-pass filter (LPF) 100, a normal sampling section 110, an optical wideband low-pass filter 120, a zoom area selection section 130, and an overlap shift sampling section 140 (readout control section). The image processing device 20 includes an anti-aliasing filter 200, a frame buffer 210 (storage section), a time-axis pixel interpolation section 220 (interpolation section), a pixel value estimation calculation section 230 (estimation calculation section), and an anti-aliasing filter 240.

Note that the configuration of the imaging device and the image processing device according to one embodiment of the invention is not limited to the configuration illustrated in FIG. 26. Various modifications may be made, such as omitting some of the elements or adding other elements. Although FIG. 26 illustrates an example in which the image processing device 20 is provided outside the imaging device 10, the image processing device 20 may be provided in the imaging device 10.

The imaging device 10 is a digital camera or a video camera, for example. The image processing device 20 is implemented by an image processing engine (IC) or a computer (PC), for example. The imaging device 10 and the image processing device 20 operate in a first mode in which wide-angle shooting (normal shooting or non-zoom shooting) is performed, or a second mode in which digital zoom shooting is performed. The mode is set by a control section (not illustrated in FIG. 26) of the imaging device 10 and the image processing device 20, for example. Note that the following description illustrates an example in which a 12-megapixel (Mpix) image sensor is used.

The optical low-pass filter 100 is used when the imaging device 10 has been set to the first mode. The optical low-pass filter 100 has a passband corresponding to the resolution (12 Mpix) of the image sensor. The normal sampling section 110 shoots a 12-Mpix image by normal wide-angle shooting instead of pixel shift shooting. The shooting rate is 15 fps, for example.

The anti-aliasing filter 200 included in the image processing device 20 performs an anti-aliasing process on the image, and outputs a 12-Mpix still image or movie.

The optical wideband low-pass filter 120 is used when the imaging device 10 has been set to the second mode. The optical wideband low-pass filter 120 has a passband corresponding to a high-resolution image obtained by shifting each pixel. For example, when shifting each pixel by a half pixel pitch, it is possible to obtain an image having a resolution of 48 (=4×12) Mpix. The zoom area selection section 130 sets a readout area. For example, when using a 2× digital zoom, the zoom area selection section 130 sets a 3 (=12/4)-Mpix readout area. The overlap shift sampling section 140 reads the light-receiving values from the readout area while performing the pixel shift control process. The shooting rate is 60 (=15×4) fps, for example.

The frame buffer 210 included in the image processing device 20 buffers shot images (eight frames) necessary for the interpolation process. The time-axis pixel interpolation section 220 interpolates the light-receiving value using the buffered images. The pixel value estimation calculation section 230 calculates the estimated pixel values from the light-receiving values obtained by the interpolation process, and outputs a 12 (−3×4)-Mpix image. The anti-aliasing filter 240 performs an anti-aliasing process on the image, and outputs a 12-Mpix high-resolution digital zoom (2×) image.

FIG. 27 illustrates a second detailed configuration example of an imaging device and an image processing device that perform zoom selection after shifting each pixel. The imaging device 10 illustrated in FIG. 27 includes the optical wideband low-pass filter 120 and the overlap shift sampling section 140. The image processing device 20 includes the frame buffer 210, the time-axis pixel interpolation section 220, the pixel value estimation calculation section 230, the anti-aliasing filter 240, and the zoom area selection section 250.

The imaging device 10 and the image processing device 20 illustrated in FIG. 27 implement digital zoom after obtaining a high-resolution image using the estimation process. More specifically, the optical wideband low-pass filter 120 has a passband that makes it possible to obtain an image having a resolution of 48 (=4×12) Mpix. The overlap shift sampling section 140 shoots an image having a resolution corresponding to the number of pixels (12 Mpix) of the image sensor while performing the pixel shift control process. The shooting rate is 60 fps, for example.

The frame buffer 210 buffers the images (eight frames), and the time-axis pixel interpolation section 220 interpolates the light-receiving values. The pixel value estimation calculation section 230 calculates the estimated pixel values, and outputs a 48 (=4×12)-Mpix image. The zoom area selection section 250 sets a zoom area corresponding to the zoom magnification, and trims the image included in the zoom area. For example, the zoom area selection section 250 outputs the 48-Mpix image when the zoom magnification is zero, and trims a 12 (=48/4)-Mpix image when using a 2× digital zoom. The anti-aliasing filter 240 outputs a 12-Mpix image by downsampling when the zoom magnification is zero, and outputs a 12-Mpix high-resolution digital zoom (2×) image when using a 2× digital zoom.

11. Color Image Estimation Method

Although an example in which the pixel values of a monochromatic image are estimated has been described above, the embodiments of the invention may also be applied when estimating the pixel values of a color image. A method that estimates the pixel values of a color image is described below.

Figure 28:
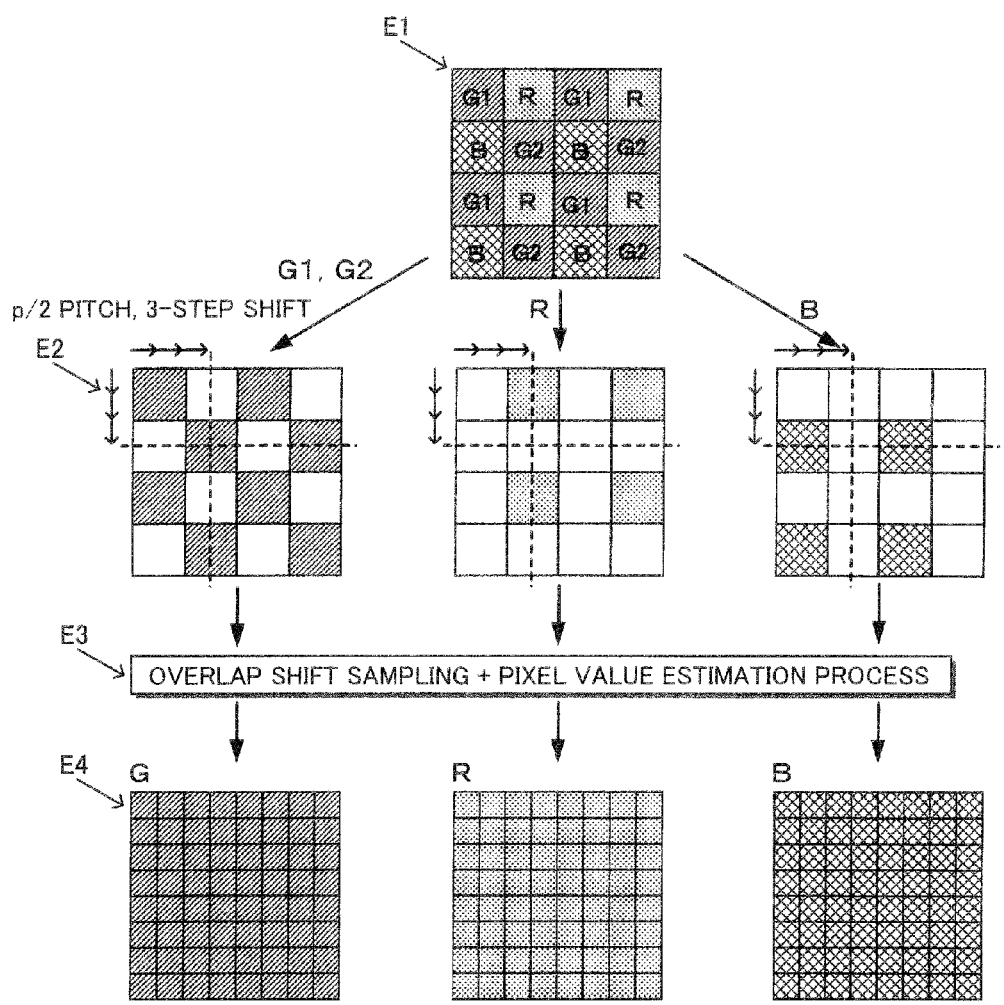
FIG. 28 is a view illustrating a first color image estimation method.

FIG. 28 is a view illustrating a first color image estimation method. The first color image estimation method estimates a high-resolution color image directly from a color mosaic image without performing a demosaicing process. As indicated by E1 in FIG. 28, light-receiving values in an RGB Bayer array are acquired using the image sensor. As indicated by E2, each pixel is shifted by a half pixel pitch in three steps in the horizontal direction and the vertical direction. As indicated by E3, high-resolution estimated pixel values are estimated from the image obtained by overlap shift sampling. As indicated by E4, a high-resolution image in each color that has a half pixel pitch is generated using the estimated pixel values.

FIG. 29 is a view illustrating a second color image estimation method. The second color image estimation method performs a demosaicing process, and estimates a high-resolution color image from the image obtained by the demosaicing process. As indicated by H1 in FIG. 29, an RGB Bayer array mosaic image is subjected to the demosaicing process. As indicated by H2, each pixel is shifted by a half pixel pitch in one step in the horizontal direction and the vertical direction. As indicated by H3, high-resolution estimated pixel values are estimated from the image obtained by overlap shift sampling. As indicated by H4, a high-resolution image in each color that has a half pixel pitch is generated using the estimated pixel values.

According to the first color image estimation method, each pixel is shifted in three steps in the horizontal direction and the vertical direction to acquire 16-frame mosaic images of each color component as low-resolution frame images. The estimated pixel values corresponding to the pixels of the high-resolution frame image are estimated on a color component basis based on the mosaic images of each color component.

According to the second color image estimation method, each pixel is shifted in one step in the horizontal direction and the vertical direction to acquire 4-frame mosaic images of each color component as low-resolution frame images. The mosaic images of each color component are subjected to the demosaicing process, and the estimated pixel values are estimated based on the images obtained by the demosaicing process.

This makes it possible to shoot a color low-resolution frame image at a high frame rate, and estimate the pixel values from the low-resolution frame image to acquire a color high-resolution frame image at an arbitrary timing.

12. Fifth Estimation Method

In the first to fourth estimation methods described above with reference to FIGS. 3A to 20, each pixel is shifted in the horizontal direction and the vertical direction to estimate the pixel values. Note that each pixel may be shifted in a diagonal direction to estimate the pixel values. A fifth estimation method that shifts each pixel in a diagonal direction is described below with reference to FIGS. 30A to 34.

Figure 30A:
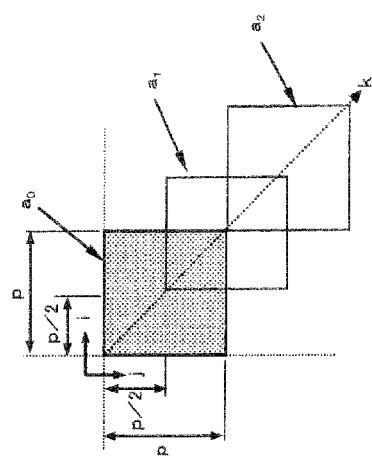
FIG. 30A is a view illustrating a light-receiving value when using a fifth estimation method.

As illustrated in FIG. 30A, light-receiving values $a_k$ (k is an integer equal to or larger than 0) are acquired while shifting each pixel by a pitch of p/2 in a diagonal direction. Note that the term "diagonal direction" used herein refers to a direction that intersects the horizontal direction and the vertical direction of the pixel array (e.g., a direction along a diagonal line of a rectangular pixel).

Figure 30B:
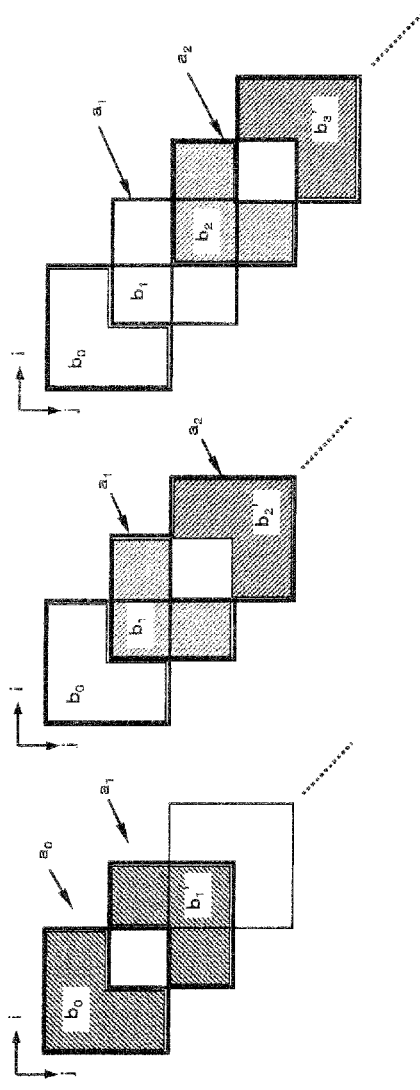
FIG. 30B is a view illustrating an intermediate pixel value when using the fifth estimation method.
Figure 31:
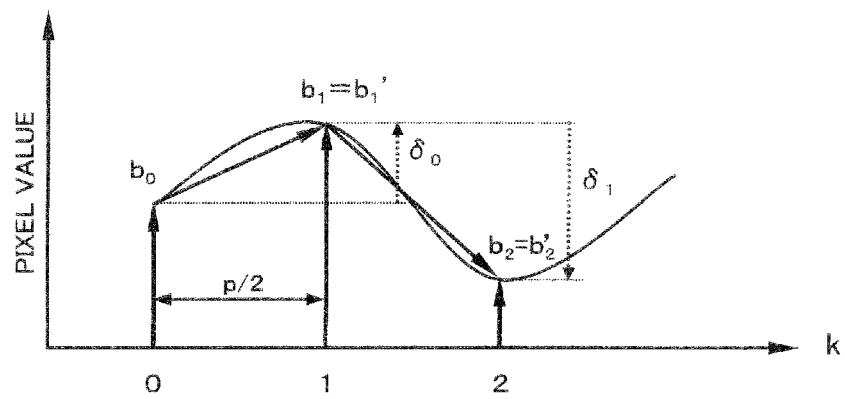
FIG. 31 is a view illustrating an intermediate pixel value estimation method according to a fifth estimation method.

A relational expression of intermediate pixel values $b_k$ (i.e., 3-pixel addition value) in the diagonal direction is calculated. As illustrated in FIG. 30B, the light-receiving values are referred to as $a_0$, $a_1$, and $a_2$ in the shift order, and the light-receiving areas of intermediate pixel values $b_0$ to $b_2$, $b_1'$, and $b_2'$ are defined so that three estimated pixel values are added up. In this case, the following expression (22) is satisfied (see FIG. 31).

$b_0 = $ (unknown), $b_1' = b_0 + \delta_0 = b_0 + (a_1 - a_0)$, $b_2' = b_1 + \delta_1 = b_1 + (a_2 - a_1)$ (22)

Since the overlapping area of the light-receiving areas of the intermediate pixel values $b_1$ and $b_1'$ is large, the following expression (23) is satisfied on the assumption that $b_1$ is nearly equal to $b_1'$, $b_0$ (unknown), $b_1 = b_0 + \delta_0 = b_0 + (a_1 - a_0)$, $b_2 = b_1 + \delta_1 = b_1 + (a_2 - a_1)$ (23)

The intermediate pixel values $b_1$ and $b_2$ can thus be calculated as a function of the intermediate pixel value $b_0$ where the intermediate pixel value $b_0$ is an unknown. Note that $\delta_0$ and $\delta_1$ indicate the difference between the sampled pixel values shifted by one shift.

Figure 32:
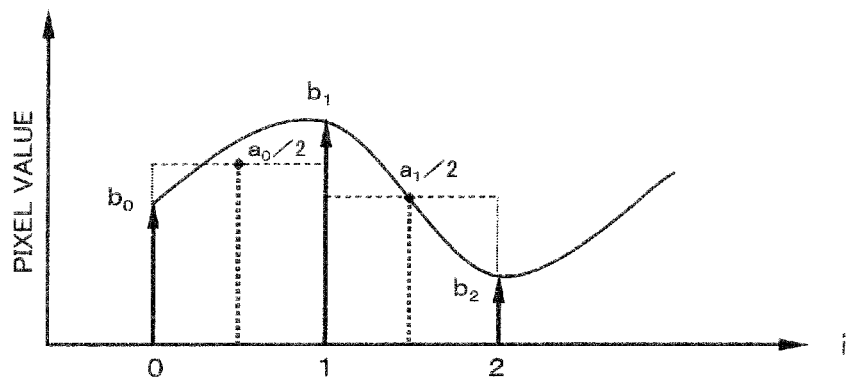
FIG. 32 is a view illustrating an intermediate pixel value estimation method according to a fifth estimation method.
Figure 33:
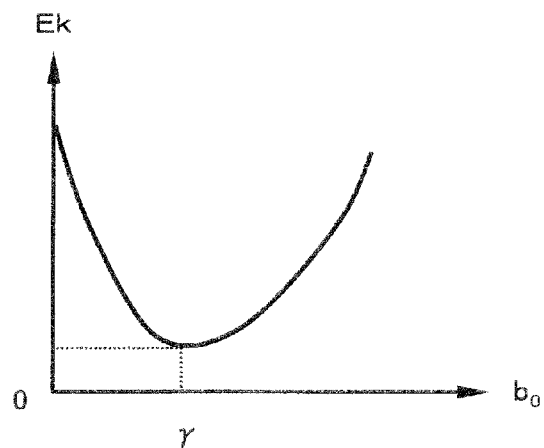
FIG. 33 is a view illustrating an intermediate pixel value estimation method according to a fifth estimation method.

The unknown ($b_0$) in the diagonal direction is then calculated to calculate the intermediate pixel values. As illustrated in FIG. 32, the sampled pixel value pattern $\{a_k\}$ detected by overlap shift sampling is compared with the intermediate pixel value pattern $\{b_k\}$. As illustrated in FIG. 33, an unknown ($b_0$) that minimizes the error E is derived, and set as the intermediate pixel value $b_0$.

More specifically, the error Ek is calculated by the following expression (24). An unknown ($b_0$) ($=\gamma$) that minimizes the error Ek is calculated, and set as the intermediate pixel value $b_0$.

$$e_k = \left(\frac{a_k}{2} - b_k\right)^2 + \left(\frac{a_k}{2} - b_{(k+1)}\right)^2,$$

$$Ek = \sum_{i=0}^{1} e_k$$

(24)

The intermediate pixel values $b_1$ and $b_2$ are determined by substituting the intermediate pixel value b0 into the expression (23). Each intermediate pixel value $\{b_k\}$ can be derived by performing the above calculations corresponding to the other pixels.

Figure 34:
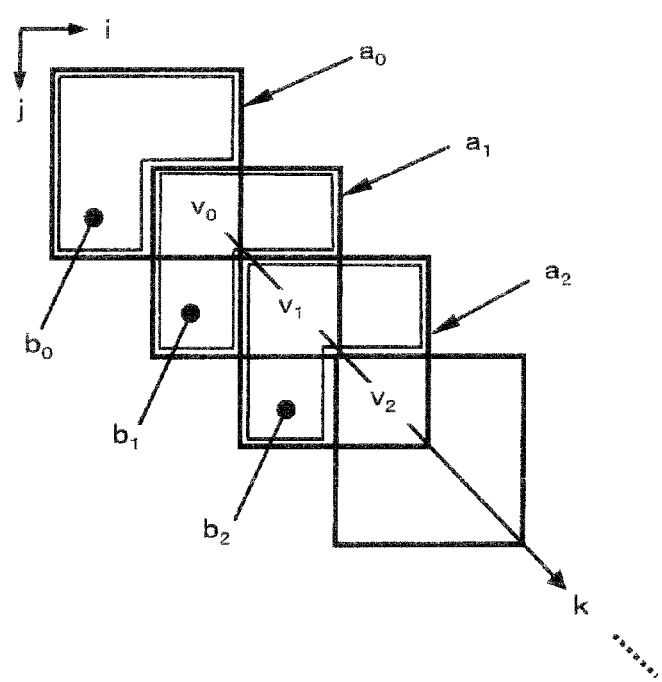
FIG. 34 is a view illustrating an estimated pixel value estimation method according to a fifth estimation method.

As illustrated in FIG. 34, the final estimated pixel value $v_k$ is the pixel value of the overlapping area of each pixel that is shifted in the diagonal direction. The following expression (25) is satisfied for the estimated pixel value. The estimated pixel value $v_k$ is calculated by substituting the light-receiving value $a_k$ and the intermediate pixel value $b_k$ into the expression (25).

$v_0 = a_0 - b_0$, $v_1 = a_1 - b_1$ (25)

According to the fifth estimation method, the pixel is shifted in the diagonal direction so that overlap occurs to acquire a low-resolution frame image (i.e., an image having the light-receiving value $a_k$). The light-receiving value $v_k$ of the overlapping area of the pixel that is shifted in the diagonal direction is estimated as the estimated pixel value.

Since it suffices to mechanically shift the pixel in only one direction when using the fifth estimation method, the pixel shift process is facilitated as compared with the case of shifting the pixel shift in the horizontal direction and the vertical direction.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., pixel value or overlap shift sampling) cited with a different term (e.g., light-receiving value or pixel shift (process)) having a broader meaning or the same meaning at least once in the specification and the drawings can be replaced by the different term in any place in the specification and the drawings. The configurations and the operations of the interpolation section, the estimation calculation section, the imaging device, the image processing device, and the like are not limited to those described in connection with the above embodiments. Various modifications and variations may be made.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. An image processing device comprising:
a hardware processor being configured to implement:
an estimation calculation section configured to estimate estimated pixel values at a pixel pitch smaller than a pixel pitch of the low-resolution frame image based on a plurality of low-resolution frame images when an image of an object is sampled while sequentially shifting a pixel so that overlap occurs, wherein an imaging operation is performed by an image sensor while sequentially shifting the pixel, and wherein a light-receiving value of the pixel obtained by each imaging operation is acquired as the low-resolution frame image; and
an image output section configured to output a high-resolution frame image that has a resolution higher than that of the plurality of low-resolution frame images based on the estimated pixel values estimated by the estimation calculation section,
wherein the pixel being shifted to be sequentially set at a first position and a second position subsequent to the first position so that the pixel set at the first position and the pixel set at the second position overlap each other, and
wherein the estimation calculation section is configured to calculate a difference between the light-receiving value of the pixel set at the first position and the light-receiving value of the pixel set at the second position, and to estimate the estimated pixel values based on the difference.

2. The image processing device as defined in claim 1,
wherein the estimation calculation section is configured to estimate the first intermediate pixel value and the second intermediate pixel value using a relational expression, and to calculate the estimated pixel values using the estimated first intermediate pixel value, and
wherein the relational expression expresses a relation between a first intermediate pixel value and a second intermediate pixel value using the difference, the first intermediate pixel value being a light-receiving value of a first light-receiving area that is obtained by excluding the overlapping area from the pixel set at the first position, and the second intermediate pixel value being a light-receiving value of a second light-receiving area that is obtained by excluding the overlapping area from the pixel set at the second position.

3. The image processing device as defined in claim 2,
wherein the relational expression expresses a relation between intermediate pixel values of an intermediate pixel value pattern using the light-receiving value of the pixel, the intermediate pixel value pattern including consecutive intermediate pixel values that include the first intermediate pixel value and the second intermediate pixel value,
wherein the estimation calculation section is configured to compare the intermediate pixel value pattern expressed by the relational expression of the intermediate pixel values and the light-receiving values of the pixel to evaluate a similarity between the intermediate pixel value pattern and the light-receiving values, and
wherein the estimation calculation section is configured to determine the intermediate pixel values of the intermediate pixel value pattern based on the evaluated similarity so that the similarity becomes a maximum.

4. The image processing device as defined in claim 3, wherein the estimation calculation section is configured to calculate an evaluation function that indicates an error between the intermediate pixel value pattern expressed by the relational expression of the intermediate pixel values and the light-receiving values of the pixel, and to determine the intermediate pixel values of the intermediate pixel value pattern so that a value of the evaluation function becomes a minimum.

5. The image processing device as defined in claim 3,
wherein a relationship between the light-receiving values of the pixel and the intermediate pixel value pattern is acquired as prior information based on a known high-resolution frame image, the prior information specifying the similarity between the light-receiving values of the pixel and the intermediate pixel value pattern in advance, and
wherein the estimation calculation section is configured to evaluate the similarity between the intermediate pixel value pattern expressed by the relational expression of the intermediate pixel values and the light-receiving values of the pixel based on the prior information.

6. The image processing device as defined in claim 5,
wherein the estimation calculation section comprises a neural network that utilizes a node weighting coefficient obtained by learning based on the known high-resolution frame image as the prior information,
wherein the neural network receives the intermediate pixel value pattern and the light-receiving values of the pixel, and outputs the evaluated similarity, and
wherein the estimation calculation section is configured to determine each intermediate pixel value included in the intermediate pixel value pattern based on the evaluated similarity evaluation result output from the neural network.

7. The image processing device as defined in claim 1,
wherein the hardware processor is further configured to implement an interpolation section configured to interpolate a light-receiving value between the light-receiving values of the pixel set at the plurality of positions in each frame in case where the pixel is shifted every frame so that the pixel is sequentially set at a plurality of positions, and is set at an identical position every multiple frames, the plurality of low-resolution frame images are consecutive low-resolution frame images that are acquired in time series corresponding to the plurality of positions,
wherein the interpolation section is configured to interpolate the light-receiving value of the pixel at a missing position in an interpolation target frame in the consecutive low-resolution frame images by a time-axis interpolation process using the light-receiving values of the pixel in frames that respectively precedes or follows the interpolation target frame, in the consecutive low-resolution frame images, and wherein the estimation calculation section is configured to estimate the estimated pixel values in each frame based on the consecutive low-resolution frame images subjected to the time-axis interpolation process performed by the interpolation section.

8. The image processing device as defined in claim 7, wherein the interpolation section is configured to perform the time-axis interpolation process using a time-axis interpolation filtering process.

9. The image processing device as defined in claim 7,
wherein the interpolation section is configured to interpolate the light-receiving value of the pixel at the missing position in the interpolation target frame using the light-receiving values of the pixel at positions identical with the missing position in the frame that precedes the interpolation target frame and the frame that follows the interpolation target frame when a difference in the light-receiving value of the pixel between the frames that respectively precede or follow the interpolation target frame is smaller than a given threshold value, and wherein the interpolation section is configured to interpolate the light-receiving value of the pixel at the missing position in the interpolation target frame using light-receiving values acquired in the interpolation target frame when the difference in the light-receiving values of the pixel in the frame that precedes the interpolation target frame and in the frame that follows the interpolation target frame is larger than the given threshold value.

10. The image processing device as defined in claim 1,
wherein a first pixel and a second pixel are adjacent to each other, the first pixel set at the first position and the first pixel set at the second position overlapping each other in a first overlapping area, and the second pixel set at the first position and the second pixel set at the second position overlapping each other in a second overlapping area, wherein the estimation calculation section is configured to estimate a first intermediate pixel value and a second intermediate pixel value, the first intermediate pixel value being a light-receiving value of a first light-receiving area that is obtained by removing the first overlapping area from the first pixel set at the first position, the second intermediate pixel value being a light-receiving value of the second light-receiving area that is obtained by removing the first overlapping area from the first pixel set at the second position, wherein the estimation calculation section is configured to set a third intermediate pixel value to be an unknown, the third intermediate pixel value being a light-receiving value of the third light-receiving area that is obtained by removing the second overlapping area from the second pixel set at the first position, wherein the estimation calculation section is configured to set a fourth intermediate pixel value using a relational expression using the unknown, the fourth intermediate pixel value being a light-receiving value of a fourth light-receiving area that is obtained by removing the second overlapping area from the second pixel set at the second position, wherein the estimation calculation section is configured to set a search range of the unknown based on the second intermediate pixel value that has been calculated as an intermediate pixel value of a second light-receiving area that is identical with a third light-receiving area, and wherein the estimation calculation section is configured to calculate the unknown within the search range by a search process to estimate the third intermediate pixel value.

11. The image processing device as defined in claim 1,
wherein a first pixel and a second pixel are adjacent to each other, the first pixel set at the first position and the first pixel set at the second position overlapping each other in a first overlapping area, and the second pixel set at the first position and the second pixel set at the second position overlapping each other in a second overlapping area, wherein the estimation calculation section is configured to estimate a first intermediate pixel value pattern that includes consecutive intermediate pixel values that include a first intermediate pixel value and a second intermediate pixel value, the first intermediate pixel value being a light-receiving value of a first light-receiving area that is obtained by removing the first overlapping area from the first pixel set at the first position, the second intermediate pixel value being a light-receiving value of the second light-receiving area that is obtained by removing the first overlapping area from the first pixel set at the second position, wherein the estimation calculation section is configured to estimate a second intermediate pixel value pattern that includes consecutive intermediate pixel values that include a third intermediate pixel value and a fourth intermediate pixel value, the third intermediate pixel value being a light-receiving value of the third light-receiving area that is obtained by removing the second overlapping area from the second pixel set at the first position, the fourth intermediate pixel value being a light-receiving value of a fourth light-receiving area that is obtained by removing the second overlapping area from the second pixel set at the second position, wherein the estimation calculation section is configured to estimate a third intermediate pixel value pattern that includes consecutive intermediate pixel values that include a fifth intermediate pixel value, and do not include the first intermediate pixel value and the fourth intermediate pixel value, the fifth intermediate pixel value being a light-receiving value of a fifth light-receiving area that is an overlapping area of the first pixel set at the second position and the second pixel set at the first position, and wherein the estimation calculation section is configured to determine an intermediate pixel value of an identical light-receiving area based on the second intermediate pixel value, the third intermediate pixel value, and the fifth intermediate pixel value obtained by estimating the first intermediate pixel value pattern, the second intermediate pixel value pattern, and the third intermediate pixel value pattern, the identical light-receiving area being the second light-receiving area, the third light-receiving area, and the fifth light-receiving area.

12. The image processing device as defined in claim 1, wherein the estimation calculation section is configured to perform a filtering process on the estimated pixel values using different filtering coefficients depending on pixel positions that respectively correspond to the estimated pixel values.

13. The image processing device as defined in claim 1,
wherein the pixel is shifted in a diagonal direction so that the pixel at the first position overlaps the pixel at the second position to acquire the low-resolution frame images, and wherein the estimation calculation section is configured to estimate the light-receiving value of an overlapping area of the pixel shifted in the diagonal direction as the estimated pixel values.

14. The image processing device as defined in claim 1,
wherein the image sensor is a color image sensor, and the pixel is shifted in three steps in a horizontal direction and a vertical direction, respectively, the low-resolution frame images being acquired as 16-frame mosaic images of each color component, and
wherein the estimation calculation section is configured to estimate the estimated pixel values corresponding to all pixels of the high-resolution frame image on each color component based on the 16-frame mosaic images of each color component.

15. The image processing device as defined in claim 1,
wherein the image sensor is a color image sensor, and the pixel is shifted in one step in a horizontal direction and a vertical direction, the low-resolution frame images being acquired as 4-frame mosaic images of each color component, and
wherein the estimation calculation section is configured to perform a demosaicing process to the 4-frame mosaic images of each color component, and to estimate the estimated pixel values based on images obtained by the demosaicing process.

16. An imaging device comprising:
an image sensor;
an imaging optical system configured to form an image of an object on the image sensor;
a hardware processor being configured to implement a pixel shift control section configured to perform a control process so that the image of the object is sampled while sequentially shifting a pixel so that overlap occurs;
a memory configured to store a light-receiving value of the pixel as a low-resolution frame image, the light-receiving value of the pixel being obtained by each imaging operation of the image sensor while shifting the pixel,
wherein the processor is further configured to implement:
an estimation calculation section configured to estimate estimated pixel values at a pixel pitch smaller than a pixel pitch of the low-resolution frame image based on the plurality of the low-resolution frame images stored in the memory; and
an image output section configured to output a high-resolution frame image which has a resolution higher than that of the plurality of low-resolution frame images based on the estimated pixel values estimated by the estimation calculation section,
wherein the pixel is shifted to be sequentially set at a first position and a second position subsequent to the first position so that the pixel set at the first position and the pixel set at the second position overlap each other, and
wherein the estimation calculation section is configured to calculate a difference between the light-receiving value of the pixel set at the first position and the light-receiving value of the pixel set at the second position, and to estimate the estimated pixel values based on the difference.

17. An information storage device stores a program, the program causing a computer to function as:
an estimation calculation section configured to estimate estimated pixel values at a pixel pitch smaller than a pixel pitch of the low-resolution frame image based on a plurality of low-resolution frame images when an image of an object is sampled while sequentially shifting a pixel so that overlap occurs, wherein an imaging operation is performed by an image sensor while sequentially shifting the pixel, and wherein a light-receiving value of the pixel obtained by each imaging operation is acquired as the low-resolution frame image; and
an image output section configured to output a high-resolution frame image that has a resolution higher than that of the low-resolution frame image based on the estimated pixel values estimated by the estimation calculation section,
wherein the pixel being shifted to be sequentially set at a first position and a second position subsequent to the first position so that the pixel set at the first position and the pixel set at the second position overlap each other, and
wherein the estimation calculation section is configured to calculate a difference between the light-receiving value of the pixel set at the first position and the light-receiving value of the pixel set at the second position, and to estimate the estimated pixel values based on the difference.

18. An image processing method comprising:
estimating estimated pixel values at a pixel pitch smaller than a pixel pitch of the low-resolution frame image based on a plurality of low-resolution frame images stored in a memory when an image of an object is sampled while sequentially shifting a pixel so that overlap occurs, wherein an imaging operation is performed by an image sensor while sequentially shifting the pixel, and wherein a light-receiving value of the pixel obtained by each imaging operation is acquired as the low-resolution frame image;
outputting a high-resolution frame image that has a resolution higher than that of the plurality of low-resolution frame images based on the estimated pixel values;
calculating a difference between a light-receiving value of the pixel set at a first position and a light-receiving value of the pixel set at a second position; and
estimating the estimated pixel values based on the difference when the pixel is shifted to be sequentially set at the first position and the second position subsequent to the first position, the pixel set at the first position and the pixel set at the second position overlapping each other.

* * * * *